United States Patent
Murai et al.

(10) Patent No.: US 8,941,634 B2
(45) Date of Patent: Jan. 27, 2015

(54) DRIVER DEVICE, DRIVING METHOD, AND DISPLAY DEVICE

(75) Inventors: Atsuhito Murai, Osaka (JP); Masami Ozaki, Osaka (JP); Kohji Saitoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 34 days.

(21) Appl. No.: 14/000,940

(22) PCT Filed: Feb. 20, 2012

(86) PCT No.: PCT/JP2012/054002
§ 371 (c)(1),
(2), (4) Date: Aug. 22, 2013

(87) PCT Pub. No.: WO2012/115051
PCT Pub. Date: Aug. 30, 2012

(65) Prior Publication Data
US 2013/0321386 A1     Dec. 5, 2013

(30) Foreign Application Priority Data
Feb. 25, 2011 (JP) .................................. 2011-040634

(51) Int. Cl.
*G06F 3/038* (2013.01)
*G09G 5/00* (2006.01)
(Continued)

(52) U.S. Cl.
CPC ......... *H04N 13/0497* (2013.01); *G09G 3/3648* (2013.01); *G09G 2310/0205* (2013.01);
(Continued)

(58) Field of Classification Search
CPC ................ G09G 2310/0251; G09G 2310/066; G09G 2310/067
USPC .................................. 345/690–699, 208–210
See application file for complete search history.

(56) References Cited

U.S. PATENT DOCUMENTS

| 6,903,715 | B2 | 6/2005 | Song |
| 2002/0190937 | A1 | 12/2002 | Song |
| 2003/0063048 | A1 | 4/2003 | Nakano et al. |
| 2004/0100203 | A1 | 5/2004 | Kobayashi et al. |
| 2004/0189586 | A1 | 9/2004 | Nagase |
| 2008/0303765 | A1 | 12/2008 | Nakatsuka |

FOREIGN PATENT DOCUMENTS

JP     2-74989 A     3/1990
(Continued)

OTHER PUBLICATIONS

Official Communication issued in International Patent Application No. PCT/JP2012/054002, mailed on Apr. 10, 2012.

*Primary Examiner* — Michael Pervan
(74) *Attorney, Agent, or Firm* — Keating & Bennett, LLP

(57) ABSTRACT

A driver device (10) of the present invention includes a scan line driving circuit (12) which carries out a first scan in which (i) the scan line driving circuit (12) starts to supply a first scan signal, which has an intermediate electric potential between a voltage of a low level in a time period during which an $n^{th}$ scan line (151) is not scanned and a voltage of a high level, to an $(n+m)^{th}$ scan line (151) during a scan period during which the $n^{th}$ scan line (151) is being scanned and (ii) the scan line driving circuit (12) stops supplying the first scan signal to the $(n+m)^{th}$ scan line (151) when scanning of the $n^{th}$ scan line (151) is completed.

12 Claims, 18 Drawing Sheets

(51) Int. Cl.
*H04N 13/04* (2006.01)
*G09G 3/36* (2006.01)

(52) U.S. Cl.
CPC .. *G09G2310/0251* (2013.01); *G09G 2310/066* (2013.01); *G09G 2310/067* (2013.01); *G09G 2320/0223* (2013.01); *G09G 3/3614* (2013.01); *G09G 2320/0247* (2013.01); *G09G 2320/0257* (2013.01); *G09G 2330/021* (2013.01)
USPC .......................................................... 345/210

(56) References Cited

FOREIGN PATENT DOCUMENTS

| | | |
|---|---|---|
| JP | 2003-29726 A | 1/2003 |
| JP | 2003-114657 A | 4/2003 |
| JP | 2004-170815 A | 6/2004 |
| JP | 2004-301989 A | 10/2004 |
| JP | 2007-248526 A | 9/2007 |
| JP | 2008-191687 A | 8/2008 |
| JP | 2008-304513 A | 12/2008 |

F I G. 3
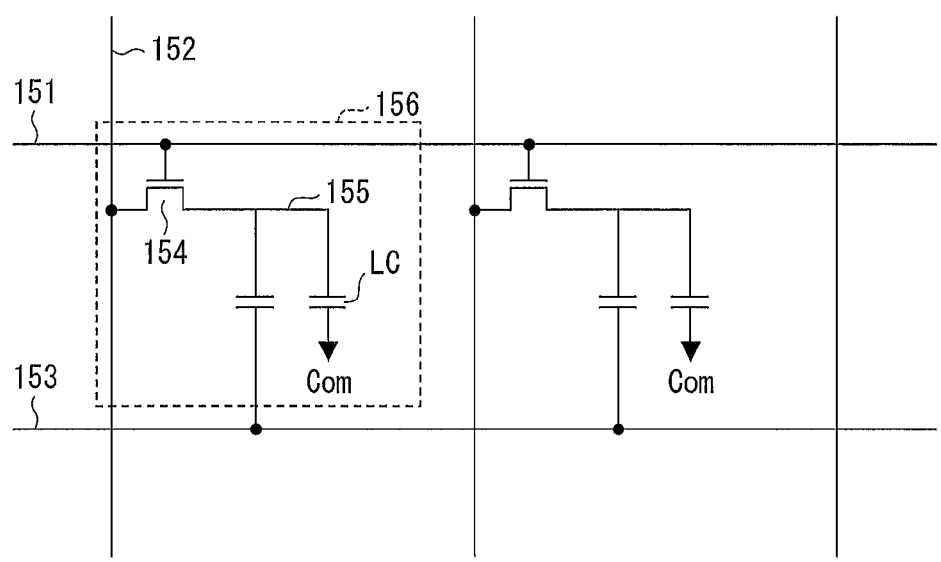

| Gs1 | Gs2 | SCAN SIGNAL |
|---|---|---|
| L | L | Vgl |
| H | L | Vgl' |
| H | H | Vgh |

F I G. 1 4
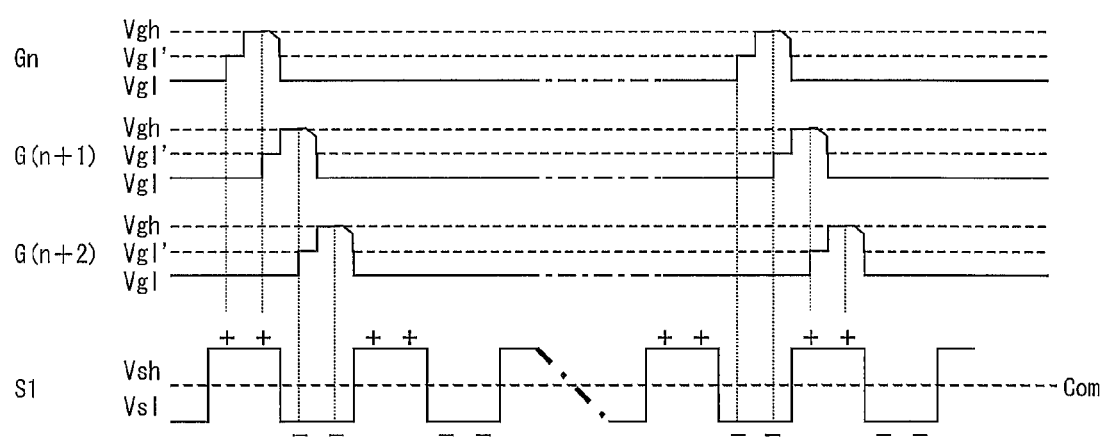

F I G. 1 5
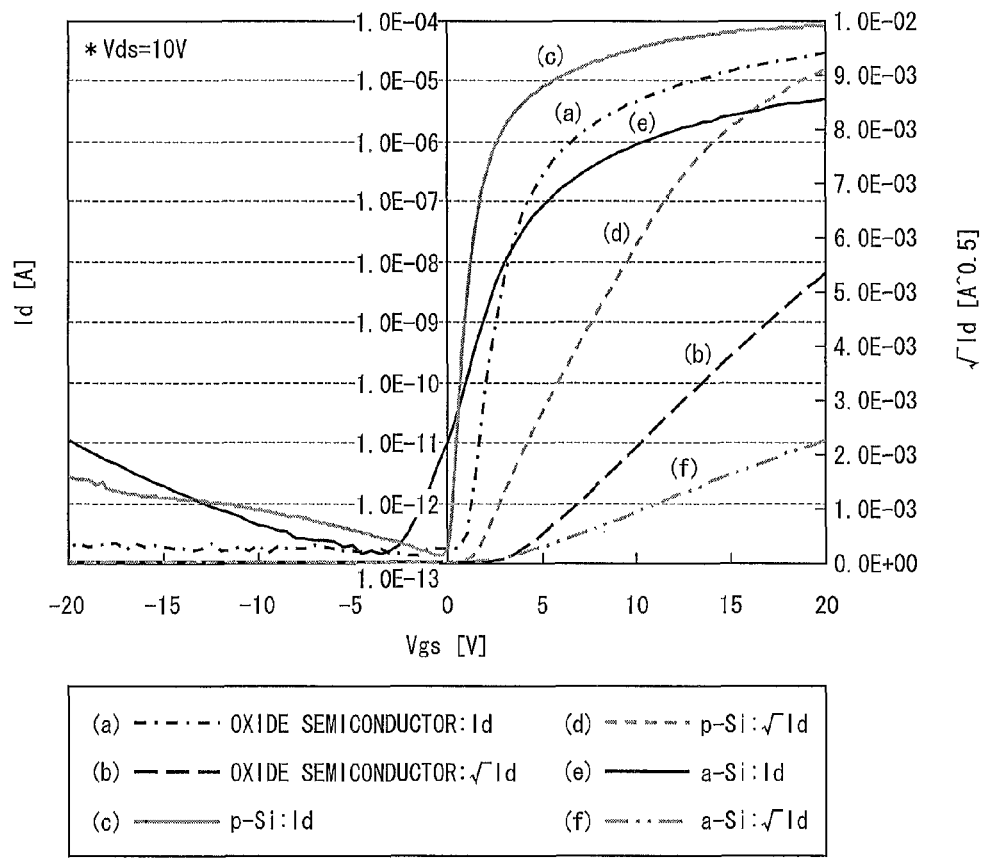

FIG. 19

| RESOLUTION | THE NUMBER OF SCAN SIGNAL LINES | SCAN PERIOD Ton [usec] | | |
|---|---|---|---|---|
| | | FRAME FREQUENCY =60Hz | FRAME FREQUENCY =120Hz | FRAME FREQUENCY =240Hz |
| VGA | 480 | 35 | 17 | 8.7 |
| SVGA | 600 | 28 | 14 | 6.9 |
| XGA | 768 | 22 | 11 | 5.4 |
| FullHD | 1080 | 15 | 8 | 3.9 |
| UXGA | 1200 | 14 | 7 | 3.5 |
| 2k x 4k | 2000 | 8 | 4 | 2.1 |

FIG. 20

| SCREEN SIZE (DIAGONAL INCH) | RESISTANCE OF SCAN LINE : Rg [kΩ] | CAPACITANCE OF SCAN LINE : Cg [pF] | TIME CONSTANT : Rg × Cg [usec] |
|---|---|---|---|
| 20 | 3 | 200 | 0.6 |
| 40 | 4 | 400 | 1.6 |
| 60 | 5 | 600 | 3.0 |

F I G. 2 3
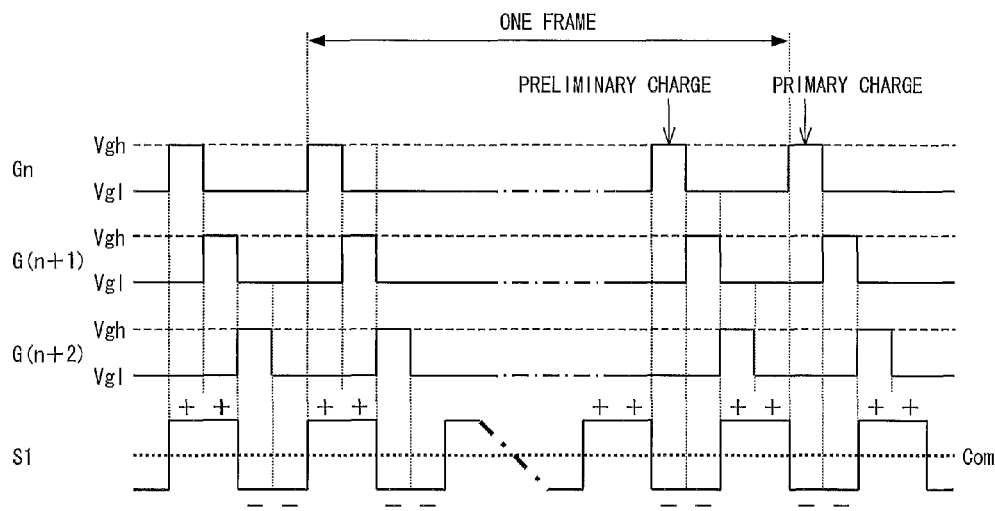
F I G. 2 4
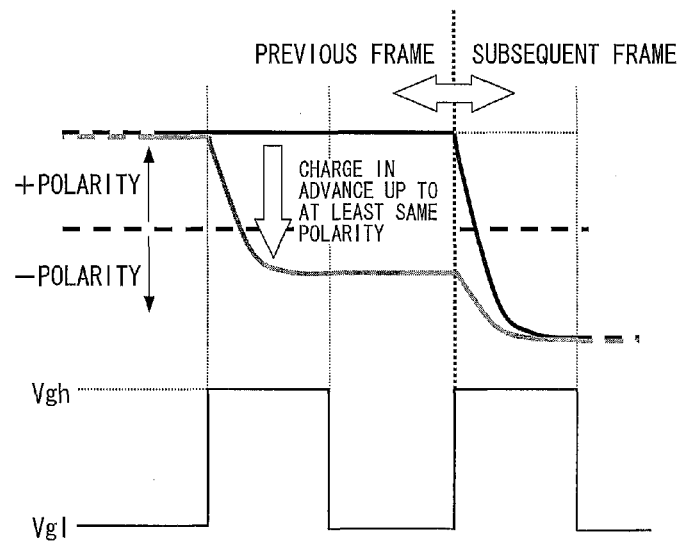

ACTUAL GATE VOLTAGE

F I G. 2 9
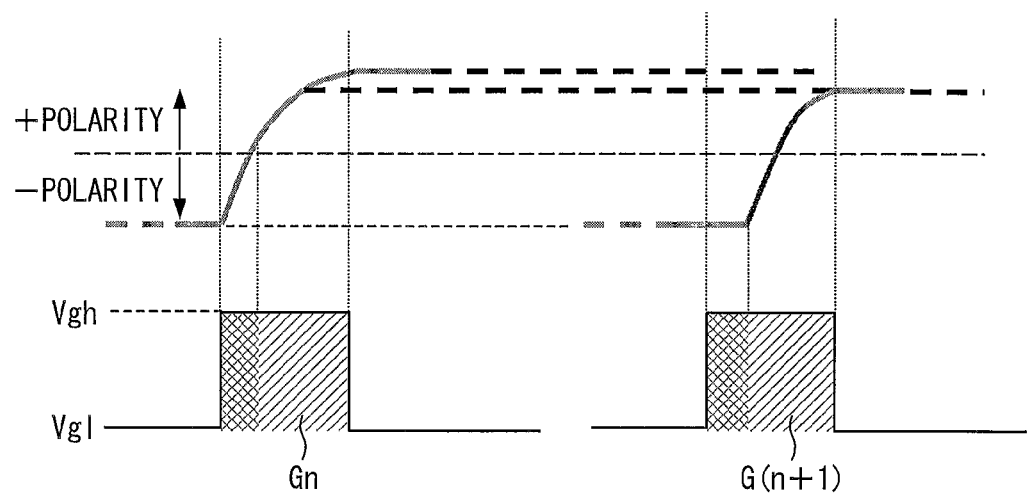

DRIVER DEVICE, DRIVING METHOD, AND DISPLAY DEVICE

TECHNICAL FIELD

The present invention relates to (i) a driver device which alleviates charging shortage of a pixel electrode and (ii) a method for driving the driver device.

BACKGROUND ART

Recently, there have advanced increase in screen size, high resolution, and high frame rate of display devices such as television receivers (hereinafter, referred to also as televisions). Televisions capable of displaying an image so that a viewer can view the image three-dimensionally (that is, carrying out 3D display) have been in widespread use.

FIG. 19 is a table showing an example of scan periods of one scan line in each of display devices that are different in resolution and the number of scan lines from one another, the each of display devices being driven at different frame frequencies.

As shown in FIG. 19, a scan period Ton of one scan line is shortened as the resolution increases, that is, as the number of scan lines increases. The scan period Ton of one scan line is also shortened as the frame frequency increases, that is, as a frame rate increases.

FIG. 20 is a table showing an example of a relationship among (i) a resistance of one scan line, (ii) a capacitance of the one scan line and (ii) a time constant with respect to each screen size of the display device whose resolution is FullHD (see FIG. 19), the display device being driven.

As shown in FIG. 20, the resistance and the capacitance of the one scan line, and the time constant are increased as the screen size increases.

As is clear from FIGS. 19 and 20, in order to attain increase in screen size, high resolution, high frame rate, and 3D display of the display devices, the scan period of one scan line is shortened, and the time constant of the one scan line is increased. This causes a reduction in charging rate of a pixel electrode, whereby the pixel electrode is inadequately charged.

The following description will discuss, with reference to FIGS. 21 and 22, an example case where a pixel electrode results in being inadequately charged because a scan period of one scan line can be kept only short.

FIG. 21 is a timing chart illustrating ideal short waveforms of a scan signal and a video signal, which timing chart is obtained in a case where a conventional driving method, in which a scan period of one scan line can be kept only short, is employed. FIG. 22 is a view illustrating a change in charging voltage of each terminal of a TFT (thin film transistor) during a scan period Ton. Note that a scan signal is supplied to a gate terminal of the TFT via a corresponding scan line, and a video signal is supplied to a source terminal of the TFT via a corresponding video signal line.

As illustrated in FIG. 21, a scan signal Gn becomes Vgh during a scan period Ton in a frame. This causes the TFT to be turned ON during the scan period Ton. During the scan period Ton during which the TFT is in an ON state, a pixel electrode connected to a drain terminal of the TFT is charged to an electric potential (positive electric potential in FIG. 21) of a video signal to be supplied via the source terminal.

Since the scan period Ton is short, a gate waveform, indicative of an ultimate voltage (gate voltage) of the gate terminal, which ultimate voltage is charged due to a scan signal to be supplied to the gate terminal, does not reach Vgh but merely reaches Vgh' (note here that Vgh'<Vgh) during the scan period Ton (see FIG. 22). This causes a drain voltage Vd, which is an ultimate voltage of the drain terminal (that is, an ultimate voltage of the pixel electrode connected to the drain terminal), to fail to reach an ultimate voltage (source voltage) Vs of the source terminal to be charged due to a video signal. Accordingly, the pixel electrode is not adequately charged. Such charging shortage of the pixel electrode attributes to lack of performance of the TFT which electrically connects the source terminal and the drain terminal to each other, the lack of performance being caused by no reach of the ultimate voltage of the gate terminal up to Vgh.

Patent Literature 1 describes a technique of preventing a drain terminal from being inadequately charged (see FIG. 24) by preliminarily charging a pixel electrode before charging (primary charging) the pixel electrode (see FIG. 23). FIG. 23 is a timing chart of a scan signal and a video signal, which timing chart is obtained in a case where the technique described in Patent Literature 1 is employed. FIG. 24 is a view illustrating a change in charging voltage of the drain terminal in a case where the technique described in Patent Literature 1 is employed.

Patent Literature 2 describes a technique of (i) setting not only a voltage which causes a TFT to be switched ON and a voltage which causes the TFT to be switched OFF but also an intermediate electric potential between the voltages (see FIG. 26) and (ii) consuming less electric power for charging a pixel electrode. FIG. 26 is a timing chart of a scan signal and a video signal, which timing chart is obtained in a case where the technique described in Patent Literature 2 is employed.

There has been devised a technique of starting to supply a scan signal to an $(n+1)^{th}$ scan line while scanning in which the scan signal is supplied to the $(n+1)^{th}$ scan line is being superimposed on scanning in which a scan signal is supplied to an $n^{th}$ scan line (see FIG. 27). This makes it possible to (i) keep a scan period Ton' longer than a normal scan period Ton and (ii) cause an ultimate voltage of a gate terminal to get closer to Vgh (see FIG. 28). FIG. 27 is a timing chart of a scan signal and a video signal, which timing chart is obtained in a case where the technique is employed, in which technique the $(n+1)^{th}$ scan line is scanned so that a scan period of the $(n+1)^{th}$ scan line is superimposed on a scan period of the $n^{th}$ scan line. FIG. 28 is a view illustrating a change in voltage of the gate terminal in the case where the technique is employed, in which technique the $(n+1)^{th}$ scan line is scanned so that the scan period of the $n+1^{th}$ scan line is superimposed on the scan period of the $n^{th}$ scan line.

CITATION LIST

Patent Literatures

Patent Literature 1
Japanese Patent Application Publication, Tokukai, No. 2007-248526 A (Publication Date: Sep. 27, 2007)
Patent Literature 2
Japanese Patent Application Publication, Tokukai, No. 2003-114657 A (Publication Date: Apr. 18, 2003)

SUMMARY OF INVENTION

Technical Problem

However, according to the technique described in Patent Literature 1, a scan signal returns to an L-level after a preliminary charging. That is, the technique described in Patent Literature 1 is not a technique of keeping a scan period constantly long. It is therefore not possible to prevent a gate voltage from failing to reach Vgh (see FIG. 25). FIG. 25 is a view illustrating a change in voltage of a gate terminal in a case where the technique described in Patent Literature 1 is employed. As illustrated in FIG. 25, according to the technique described in Patent Literature 1, it is not possible to prevent a pixel electrode from being inadequately charged due to a shortage in ultimate voltage of the gate terminal in a case where a scan period can be kept only short.

According to the technique described in Patent Literature 2, during a scan period during which a scan line is scanned, (i) a voltage of a scan signal is kept at GND during a certain time period, (ii) the voltage is increased to Vgh and then (iii) the voltage is kept again at GND for a certain time period. Therefore, in a case where the scan period can be kept only short, a time period, during which the scan line is scanned at a higher voltage Vgh, is shortened. Therefore, the technique described in Patent Literature 2 further remarkably causes a pixel electrode to be inadequately charged due to an inadequate gate voltage in the case where the scan period can be kept only short.

FIG. 29 illustrates a change in voltage of a drain terminal in a case where a technique is employed in which technique an $(n+1)^{th}$ scan line is scanned so that a scan period of the $(n+1)^{th}$ scan line is superimposed on a scan period of an $n^{th}$ scan line. The technique is effective in a case where a video signal has a polarity during the scan period of the $n^{th}$ scan line, identical to a polarity which the video signal has during the scan period of the $(n+1)^{th}$ scan line, but is not effective in a case where the video signal has a polarity during the scan period of the $n^{th}$ scan line, reversed from a polarity which the video signal has during the scan period of the $(n+1)^{th}$ scan line (see FIG. 29). Therefore, a display quality changes depending on the polarity of the video signal. This ultimately deteriorates the display quality.

Note that it can be considered increasing a voltage of a scan signal, which voltage is to be applied to a gate terminal of a TFT, in order to prevent a shortage in ultimate voltage of the gate terminal. In a case where the voltage of the scan signal is increased, however, it is necessary to use high voltage-resistance components such as a driving circuit and a TFT. This causes a rise in cost.

It can be also considered increasing the size of the TFT in order to prevent the shortage in the ultimate voltage of the gate terminal. However, such increase in the size of the TFT causes an increase in load on electric wires in a display panel. This ultimately reduces an aperture ratio.

The present invention was made in view of the problems, and a main object of the present invention is to provide a driver device capable of (i) suppressing rise in cost and reduction in aperture ratio and (ii) preventing a pixel electrode from being inadequately charged even in a case where the pixel electrode should be charged at a high speed.

Solution to Problem

In order to attain the main object of the present invention, a driver device of the present invention is arranged to be a driver device for driving a display panel, the display panel including (i) a plurality of scan lines, (ii) a plurality of video signal lines provided so as to intersect the plurality of scan lines, (iii) pixel regions defined by the plurality of scan lines and the plurality of video signal lines, (iv) pixel electrodes provided in the respective pixel regions and (v) TFTs each electrically connecting or disconnecting, in response to a scan signal supplied to a corresponding one of the plurality of scan lines, a corresponding one of the pixel electrodes with or from a corresponding one of the plurality of video signal lines, respectively, the driver device, including: a scan line driving circuit for sequentially supplying scan signals to the plurality of scan lines; a video signal line driving circuit for sequentially supplying video signals to the plurality of video signal lines; and a timing control circuit for controlling (i) a timing at which the scan line driving circuit supplies a scan signal and (ii) a timing at which the video signal line driving circuit supplies video signals, the scan line driving circuit carrying out a first scan in which (i) the scan line driving circuit starts to supply a first scan signal, which has an intermediate electric potential between a voltage of a low level in a time period during which an $(n+m)^{th}$ (n: positive integer, m: positive integer) scan line is not scanned and a voltage of a high level, to the $(n+m)^{th}$ scan line during a scan period during which an $n^{th}$ scan line is being scanned and (ii) the scan line driving circuit stops supplying the first scan signal to the $(n+m)^{th}$ scan line when scanning of the $n^{th}$ scan line is completed, and the scan line driving circuit carrying out a second scan in which the scan line driving circuit supplies a second scan signal, which has the voltage of the high level, to the $(n+m)^{th}$ scan line when the scanning of the $n^{th}$ scan line is completed.

A driver device driving method of the present invention is arrange to be a method of driving a driver device that drives a display panel, the display pane including (i) a plurality of scan lines, (ii) a plurality of video signal lines provided so as to intersect the plurality of scan lines, (iii) pixel regions defined by the plurality of scan lines and the plurality of video signal lines, (iv) pixel electrodes provided in the respective pixel regions and (v) TFTs each electrically connecting or disconnecting, in response to a scan signal supplied to a corresponding one of the plurality of scan lines, a corresponding one of the pixel electrodes with or from a corresponding one of the plurality of video signal lines, respectively, the driver device including: a scan line driving circuit for sequentially supplying scan signals to the plurality of scan lines; a video signal line driving circuit for sequentially supplying video signals to the plurality of video signal lines; and a timing control circuit for controlling (i) a timing at which the scan line driving circuit supplies a scan signal and (ii) a timing at which the video signal line driving circuit supplies video signals, the method including the steps of: (a) carrying out a first scan in which (i) the scan line driving circuit starts to supply a first scan signal, which has an intermediate electric potential between a voltage of a low level in a time period during which an $(n+m)^{th}$ (n: positive integer, m: positive integer) scan line is not scanned and a voltage of a high level, to the $(n+m)^{th}$ scan line during a scan period during which an $n^{th}$ scan line is being scanned and (ii) the scan line driving circuit stops supplying the first scan signal to the $(n+m)^{th}$ scan line when scanning of the $n^{th}$ scan line is completed, and (b) carrying out a second scan in which the scan line driving circuit supplies a second scan signal, which has the voltage of the high level, to the $(n+m)^{th}$ scan line when the scanning of the $n^{th}$ scan line is completed.

With the arrangement, the driver device supplies, during the first scan, the first scan signal to the $(n+m)^{th}$ scan line. This allows a gate voltage of a TFT, that is connected to the $(n+m)^{th}$ scan line, reaches, in advance before the second scan (that is, during the scanning of the $n^{th}$ scan line), a voltage shown before reaching a voltage which causes the TFT to be turned ON. The driver device then causes the gate voltage of the TFT to reach the voltage of the high level during the second scan. That is, it is not necessary that the gate voltage of the TFT is charged up to the voltage of the high level from the voltage of the low level during the second scan, but it is merely necessary that the gate voltage of the TFT is charged up to the voltage of the high level from the voltage shown before reaching the voltage which causes the TFT to be turned ON. It is therefore possible to shorten a time period required for the gate voltage of the TFT, connected to the $(n+m)^{th}$ scan line, to reach the voltage of the high level during the second scan. This allows the gate voltage of the TFT to reach the voltage of the high level even in a case where a time period, during which the second scan is carried out, can be kept only short.

Since the gate voltage of the TFT can reach the voltage of the high level for a short period of time, it is possible to prevent a drain voltage from being inadequately charged due to a shortage in ultimate voltage of a gate terminal of the TFT. That is, it is possible to prevent a pixel electrode from being inadequately charged in a case where the pixel electrode should be charged at a high speed.

It is further possible to reduce manufacturing cost because it is not necessary to use high voltage-resistance components such as a driving circuit and a TFT. This is based on the fact that it is not necessary to increase a voltage of a scan signal, which voltage is to be applied to a gate electrode of the TFT, in order to prevent the pixel electrode from being inadequately charged due to the shortage in the ultimate voltage of the gate terminal.

Furthermore, it is possible to improve an aperture ratio because the display panel has reduced load on electric wires. This is based on the fact that it is not necessary to increase the size of the TFT in order to prevent the pixel electrode from being inadequately charged due to the shortage in the ultimate voltage of the gate terminal.

Note that examples of the case where the pixel electrode should be charged at a high speed encompass (i) a case where a display screen is large (that is, a case where load is heavy), (ii) a case where a high resolution is required, (iii) a case where a high frame rate is required and (iv) a case where a 3D display is carried out by means of driving such as driving of a parallax barrier system. Note, however, that the examples are not limited to such.

Advantageous Effects of Invention

A driver device of the present invention is arranged to be a driver device for driving a display panel, the display panel including (i) a plurality of scan lines, (ii) a plurality of video signal lines provided so as to intersect the plurality of scan lines, (iii) pixel regions defined by the plurality of scan lines and the plurality of video signal lines, (iv) pixel electrodes provided in the respective pixel regions and (v) TFTs each electrically connecting or disconnecting, in response to a scan signal supplied to a corresponding one of the plurality of scan lines, a corresponding one of the pixel electrodes with or from a corresponding one of the plurality of video signal lines, respectively, the driver device, including: a scan line driving circuit for sequentially supplying scan signals to the plurality of scan lines; a video signal line driving circuit for sequentially supplying video signals to the plurality of video signal lines; and a timing control circuit for controlling (i) a timing at which the scan line driving circuit supplies a scan signal and (ii) a timing at which the video signal line driving circuit supplies video signals, the scan line driving circuit carrying out a first scan in which (i) the scan line driving circuit starts to supply a first scan signal, which has an intermediate electric potential between a voltage of a low level in a time period during which an $(n+m)^{th}$ (n: positive integer, m: positive integer) scan line is not scanned and a voltage of a high level, to the $(n+m)^{th}$ scan line during a scan period during which an $n^{th}$ scan line is being scanned and (ii) the scan line driving circuit stops supplying the first scan signal to the $(n+m)^{th}$ scan line when scanning of the $n^{th}$ scan line is completed, and the scan line driving circuit carrying out a second scan in which the scan line driving circuit supplies a second scan signal, which has the voltage of the high level, to the $(n+m)^{th}$ scan line when the scanning of the $n^{th}$ scan line is completed.

According to the arrangement, it is possible to (i) suppress increase in cost and reduction in aperture ratio and (ii) prevent the pixel electrodes from being inadequately charged even in a case where the pixel electrodes should be charged at a high speed.

BRIEF DESCRIPTION OF DRAWINGS

FIG. 3 is a view illustrating a configuration of a display panel that is included in the display device illustrated in FIG. 1.

FIG. 14 is a timing chart, in accordance with another embodiment of the present invention, which illustrates a relationship between scan signals and a video signal.

FIG. 15 is a graph illustrating (i) a dependency of a drain current Id on a gate-source voltage Vgs in a TFT whose semiconductor layer is made of an oxide semiconductor or p-Si and (ii) a dependency of $\sqrt{Id}$ (the square root of the drain current Id) on the gate-source voltage Vgs in the TFT.

FIG. 19 is a table showing an example of scan periods of one scan line in each of display devices that are different in resolution and the number of scan lines from one another, the each of display devices being driven at different frame frequencies.

FIG. 20 is a table showing an example of a relationship among (i) a resistance of one scan line, (ii) a capacitance of the one scan line and (iii) a time constant with respect to each screen size of a display device whose resolution is FullHD, the display device being driven.

FIG. 23 is a timing chart of a scan signal and a video signal, which timing chart is obtained in a case where a technique described in Patent Literature 1 is employed.

FIG. 24 is a view illustrating a change in charging voltage of a drain terminal in the case where the technique described in Patent Literature 1 is employed.

FIG. 29 is a view illustrating a change in voltage of a drain terminal in the case where the technique is employed in which the $(n+1)^{th}$ scan line is scanned so that the scan period of the $(n+1)^{th}$ scan line is superimposed on the scan period of the $n^{th}$ scan line.

DESCRIPTION OF EMBODIMENTS

Embodiment 1

The following description will discuss, with reference to FIGS. 1 through 7, (i) a driver device in accordance with Embodiment 1 of the present invention, (ii) a display device including the driver device and (iii) a method of driving the display device. Note that unless otherwise specifically described, a configuration described in Embodiment 1 does not limit the scope of the present invention only to the configuration but is just a mere example description.

(Configuration of Display Device)

Figure 1:
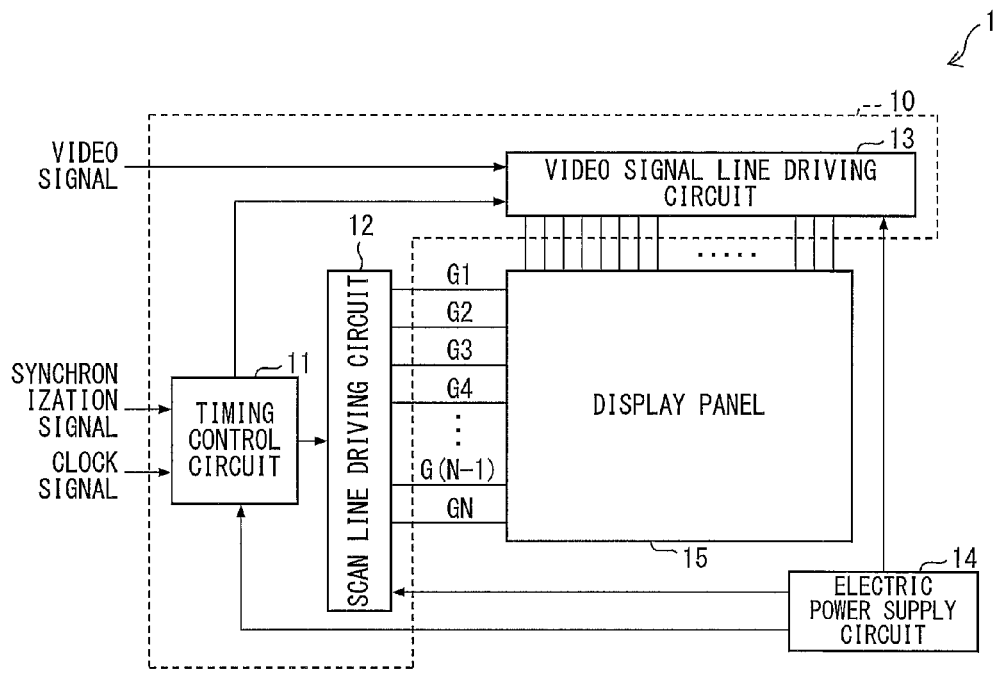
FIG. 1 is a block diagram illustrating a main configuration of a display device in accordance with an embodiment of the present invention.
Figure 2:
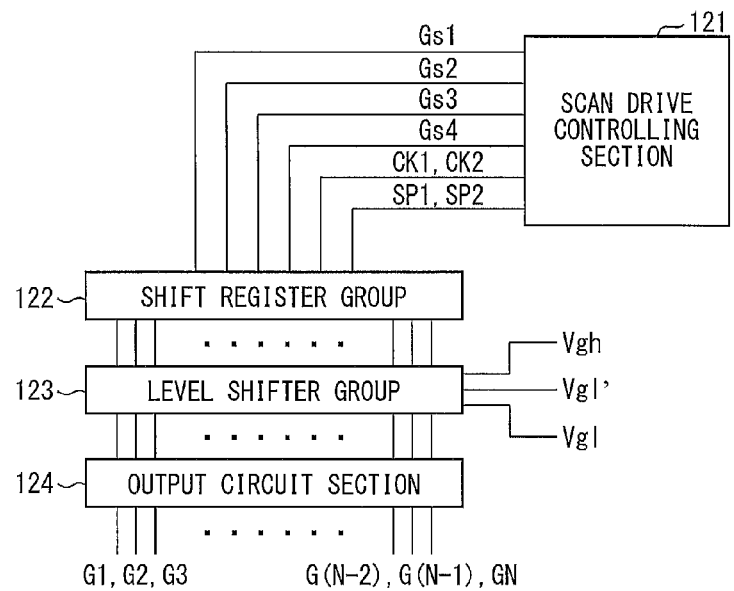
FIG. 2 is a block diagram illustrating a configuration of a scan line driving circuit that is included in the display device illustrated in FIG. 1.

The following description will discuss the display device of Embodiment 1 with reference to FIGS. 1 through 3. First, a configuration of a display device 1 of Embodiment 1 will be described below with reference to FIG. 1. FIG. 1 is a block diagram illustrating a main configuration of the display device 1 of Embodiment 1.

The display device 1 includes a driver device 10, an electric power supply circuit 14, and a display panel 15 (see FIG. 1). The driver device 10 includes (i) a timing control circuit 11, (ii) a scan line driving circuit 12, and (iii) a video signal line driving circuit 13 (see FIG. 1).

The timing control circuit 11 (i) receives synchronization signals and gate clock signals which are externally supplied and (ii) outputs control signals for controlling the display panel 15 to display an image. Specifically, the timing control circuit 11 supplies, to the scan line driving circuit 12, scan control signals (later described), gate clock signals, and gate start pulse signals. The timing control circuit 11 also supplies, to the video signal line driving circuit 13, source clock signals, source start pulse signals, and latch strobe signals.

The scan line driving circuit 12 receives, from the timing control circuit 11, (i) scan control signals Gs1 through Gs4, (ii) gate clock signals CK1 and CK2 and (iii) gate start pulse signals SP1 and SP2. In response to the signals supplied from the timing control circuit 11, the scan line driving circuit 12 supplies scan signals to respective scan lines 151 that are included in the display panel 15.

The video signal line driving circuit 13 receives, from the timing control circuit 11, the source clock signals, the source start pulse signals, and the latch strobe signals, and also receives video signals which are externally supplied. In response to the signals, the video signal line driving circuit 13 supplies video signals to respective video signal lines 152 that are included in the display panel 15.

The electric power supply circuit 14 supplies electric power to the timing control circuit 11, the scan line driving circuit 12, the video signal line driving circuit 13, and other components (not illustrated) that are included in the display device 1.

(Configuration of Display Panel)

A configuration of the display panel 15 will be described below with reference to FIG. 3. FIG. 3 is a view illustrating the configuration of the display panel 15 that is included in the display device 1 of Embodiment 1. Note that Embodiment 1 describes an example case where the display panel is a liquid crystal display panel. Note, however, that the display panel is not limited to the liquid crystal display panel, and can therefore be a display such as an EL display or a plasma display.

The display panel 15 includes a counter electrode Com and a TFT substrate. The TFT substrate includes (i) the scan lines 151, (ii) the video signal lines 152, (iii) retention capacitor lines 153, (iv) TFTs 154, and (v) pixel electrodes 155 (see FIG. 3). The display panel 15 also includes a liquid crystal layer which is formed by sealing liquid crystal LC into a space between the TFT substrate and the counter electrode Com. The display panel 15 further includes a color filter, a polarizing plate, and an alignment film (all of which are not illustrated).

The display panel 15 has pixel regions 156 defined by the scan lines 151 and the video signal lines 152 (see FIG. 3).

Each TFT 154 has (i) a gate terminal connected to a corresponding one of the scan lines 151, (ii) a source terminal connected to a corresponding one of the video signal lines 152 and (iii) a drain terminal connected to a corresponding one of the retention capacitor lines 153 via a corresponding retention capacitor (not illustrated). Note that, for convenience, (i) one of the two terminals, other than the gate terminal of the three terminals of the TFT 154, connected to the corresponding one of the video signal lines 152, is referred to as the source terminal and (ii) the other of the two terminals, which is connected to the corresponding one of the retention capacitor lines 153 via the corresponding retention capacitor, is referred to as the drain terminal. Note, however, that the two terminals are not limited to being referred to as the respective source and drain terminals, and can therefore be referred to as the respective drain and source terminals.

Note that a semiconductor layer of the TFT 154 is generally made from a material such as a-Si (amorphous Silicon). Note, however, that the semiconductor layer is not limited to such a material.

A scan signal is supplied from the scan line driving circuit 12 to the TFT 154 that is connected to the scan line 151, via the scan line 151. A video signal is supplied from the video signal line driving circuit 13 to a pixel electrode 155 of a TFT 154 that is connected to the video signal line 152, via the video signal line 152.

(Configuration of Scan Line Driving Circuit)

A configuration of the scan line driving circuit 12 will be described below in detail with reference to FIG. 2. FIG. 2 is a block diagram illustrating the configuration of the scan line driving circuit 12 that is included in the display device 1 of Embodiment 1.

The scan line driving circuit 12 includes a scan drive controlling section 121, a shift register group 122, a level shifter group 123, and an output circuit section 124 (see FIG. 2).

The scan drive controlling section 121 supplies, to the shift register group 122, the scan control signals Gs1 through Gs4, the gate clock signals CK1 and CK2, and the gate start pulse signals SP1 and SP2, in response to the scan control signals, the gate clock signals, and the gate start pulse signals supplied from the timing control circuit 11.

The gate clock signals CK1 and CK2 are for controlling timings at which scan signals are supplied to two scan lines 151. By controlling the timings by use of the gate clock signals CK1 and CK2, it is possible to independently control timing at which the scan signals are supplied to the two scan lines 151.

The scan control signals Gs1 through Gs4 are for controlling scan signals to be supplied to the respective scan lines 151. The gate start pulse signals SP are for controlling a frame cycle.

The shift register group 122 includes (i) a plurality of set/reset type flip flops and (ii) a plurality of switching circuits. The shift register group 122 supplies the scan control signals Gs1 through Gs4 to the shift register group 122. Specifically, in response to the gate start pulse signals SP, the shift register group 122 supplies, to the level shifter group 123, the scan control signals Gs1 through Gs4 in synchronization with the gate clock signals CK, via output terminals connected to the level shifter group 123.

The level shifter group 123 includes a plurality of level shifter circuits, and generates scan signals on the basis of the respective scan control signals Gs1 through Gs4 which have been supplied from the shift register group 122. Note that how to generate the scan signals will be described later with reference to other drawings. The scan signals thus generated are supplied to the output circuit section 124.

The output circuit section 124 is provided for sequentially supplying, to the total N scan lines 151 (note that N is a natural number) that are included in the display panel 15, the scan signals which have been supplied from the level shifter group 123.

(How to Generate Scan Signal)

Figure 4:
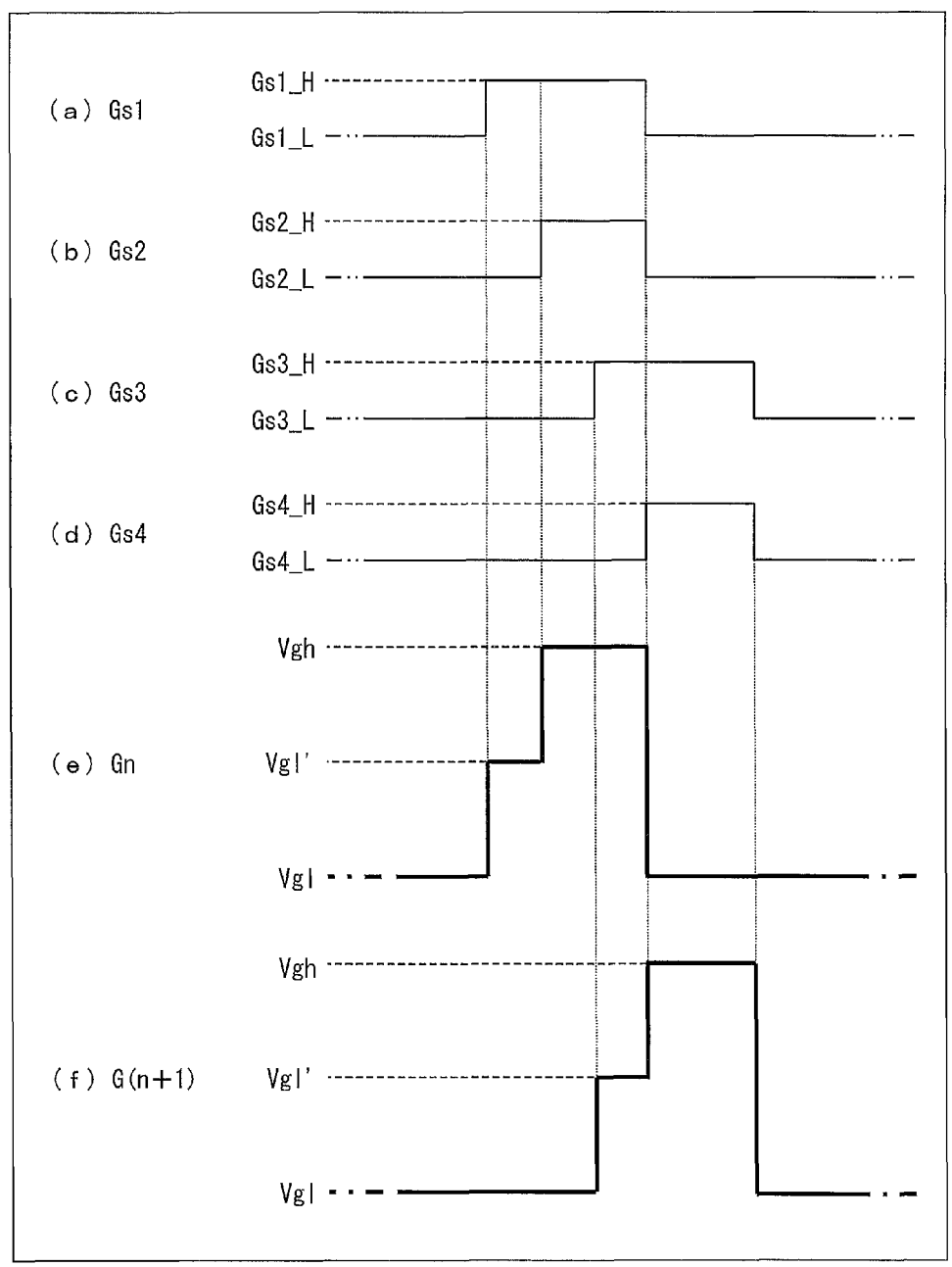
FIG. 4 is a view illustrating waveforms of scan signals generated by a level shifter group that is included in the scan line driving circuit illustrated in FIG. 2.
Figures 5, 6:
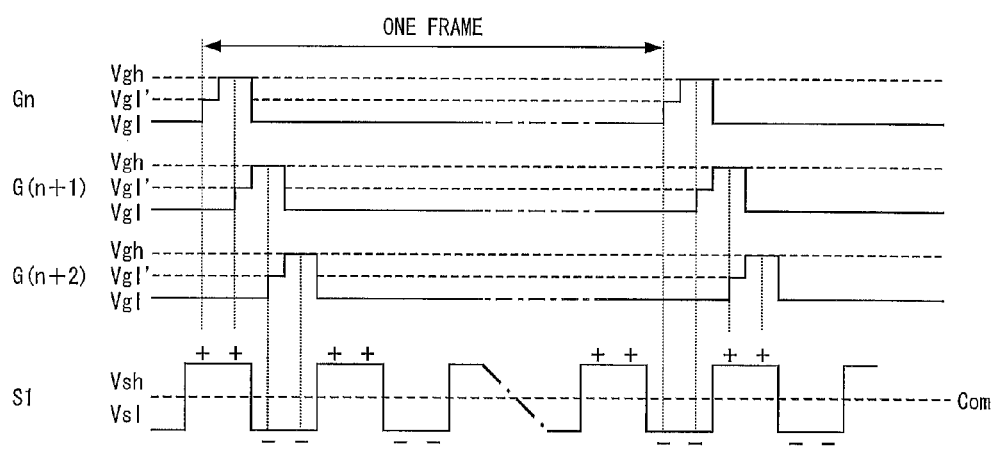
FIG. 5 is a truth table showing each value of a scan signal for corresponding levels of two scan control signals.
FIG. 6 is a timing chart illustrating a relationship between scan signals and a video signal in the display device illustrated in FIG. 1.

The following description will discuss how to generate scan signals with reference to FIGS. 4 and 5. FIG. 4 is a view illustrating waveforms of scan signals generated by the level shifter group 123.

Each of the scan control signals Gs1 through Gs4 supplied from the shift register group 122 is a binary signal that has an H-level (high level) or an L-level (low level) (see FIG. 4). The level shifter group 123 generates, on the basis of the scan control signals Gs1 and Gs2, a scan signal Gn to be supplied to an $n^{th}$ scan line 151 (n: positive integer, and n≤N). The level shifter group 123 also generates, on the basis of the scan control signals Gs3 and Gs4, a scan signal G(n+1) to be supplied to an $(n+1)^{th}$ scan line 151. Each of the scan signals Gn and G(n+1) is a ternary signal of Vg1, Vg1', or Vgh.

(a) of FIG. 4 illustrates a pulse waveform of the scan control signal Gs1. (b) of FIG. 4 illustrates a pulse waveform of the scan control signal Gs2. (c) of FIG. 4 illustrates a pulse waveform of the scan control signal Gs3. (d) of FIG. 4 illustrates a pulse waveform of the scan control signal Gs4. (e) of FIG. 4 illustrates a pulse waveform of the scan signal Gn to be generated on the basis of the scan control signals Gs1 and Gs2. (f) of FIG. 4 illustrates a pulse waveform of a scan signal G(n+1) to be generated on the basis of the scan control signals Gs3 and Gs4.

The following description will discuss, with reference to a truth table shown in FIG. 5, how a scan signal Gn changes in response to the scan control signals Gs1 and Gs2. FIG. 5 is the truth table showing how the scan signal Gn changes in response to the scan control signals Gs1 and Gs2.

As is clear from FIGS. 4 and 5, (i) the scan signal Gn becomes Vg1 in a case where the scan control signals Gs1 and Gs2 each have the L-level, (ii) the scan signal Gn becomes Vg1' in a case where the scan control signal Gs1 and Gs2 have the H-level and the L-level, respectively, and (iii) the scan signal Gn becomes Vgh in a case where the scan control signals Gs1 and Gs2 each have the H-level.

The scan signal Gn becomes Vg1 in a case where the scan control signals Gs3 and Gs4 each have the L-level. The scan signal Gn becomes Vg1' in a case where the scan control signals Gs3 and Gs4 have the H-level and the L-level, respectively. The scan signal Gn becomes Vgh in a case where the scan control signals Gs3 and Gs4 each have the H level (see FIG. 4).

Note that, according to Embodiment 1, (i) a scan signal G(n+2) to be supplied to an $(n+2)^{th}$ scan line 151 can be generated on the basis of scan signals Gs1 and Gs2 and (ii) a scan signal G(n+3) to be supplied to an $(n+3)^{th}$ scan line 151 can be generated on the basis of scan control signals Gs3 and Gs4.

(Operation of Driver Device)

The following description will discuss, with reference to FIG. 6, a relationship between scan signals and a video signal in the driver device 10 which is included in the display device 1 of Embodiment 1. FIG. 6 is a timing chart illustrating the relationship between the scan signals and the video signal in the display device 10 of Embodiment 1.

As illustrated in FIG. 6, the scan line driving circuit 12 supplies a scan signal G(n+1) of Vg1' to the $(n+1)^{th}$ scan line 151 while scanning of the $(n+1)^{th}$ scan line 151 is being superimposed on scanning in which a scan signal Gn scans the $n^{th}$ scan line 151 (first scan). When scanning of the $n^{th}$ scan line 151 is completed, the scan line driving circuit 12 supplies a scan signal G(n+1) of Vgh to the $(n+1)^{th}$ scan line 151 (second scan). That is, the scan signal repetitively changes from Vg1 to Vg1', from Vg1' to Vgh, and then from Vgh to Vg1 (see FIG. 6).

Note that the voltage Vg1' which is the scan signal to be supplied during the first scan is equal to an intermediate electric potential (hereinafter, referred to also as an intermediate electric potential Vg1') between (i) a voltage Vg1 (i.e., L-level) in a time period during which the $n^{th}$ scan line 151 is not scanned and (ii) a voltage Vgh (i.e., H-level) of the scan signal to be supplied during the second scan. Note also that the intermediate electric potential Vg1' is smaller than a gate voltage which causes a TFT 154 to be turned ON.

Figure 7:
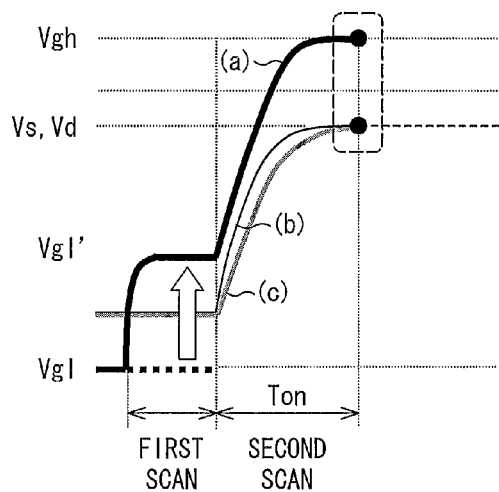
FIG. 7 is a view illustrating change in charging voltage across each terminal of a TFT during a first scan and a second scan.

FIG. 7 is a view illustrating a change in charging voltage of each terminal of a TFT during a first scan and a second scan.

A gate voltage is charged up to an intermediate electric potential Vg1' during a time period of the first scan (hereinafter, referred to also as a first scan period) (see FIG. 7). Note that, during the first scan period, a source voltage and a drain voltage each still have an L-level. This is because the gate voltage is smaller than a voltage which causes a corresponding TFT 154 to be turned ON. Then, the gate voltage is charged up to a voltage Vgh (i.e., H-level) from the intermediate electric potential Vg1' during a time period of the second scan. This prevents the drain voltage from being inadequately charged due to a shortage in ultimate voltage of a gate terminal of the TFT 154. As such, a drain voltage Vd can be charged up to the source voltage Vs.

With the configuration, the driver device 10 supplies, during a first scan, an intermediate electric potential Vg1' to a scan line 151. This allows a gate voltage of a TFT 154, that is connected to the scan line 151 to which the first scan signal has been supplied, to reach, in advance before a second scan, a voltage shown before reaching a voltage which causes the TFT 154 to be turned ON. The driver device 10 then causes the gate voltage of the TFT 154 to reach an H-level voltage during the second scan. That is, it is not necessary that the gate voltage of the TFT 154 is charged up to an H-level voltage Vgh from an L-level voltage Vg1 during the second scan, but it is merely necessary that the gate voltage of the FTF 154 is charged up to the H-level voltage Vgh from the intermediate electric potential Vg1' shown before reaching the voltage which causes the TFT 154 to be turned ON. It is therefore possible to shorten a time period required for the gate voltage of the TFT 154 to reach the H-level voltage Vgh during the second scan. This allows the gate voltage of the TFT 154 to reach the H-level voltage Vgh even in a case where a time period, during which the second scan is carried out, is short.

Since the gate voltage of the TFT 154 can reach the H-level voltage Vgh for a short period of time, it is possible to prevent a drain voltage from being inadequately charged due to a shortage in ultimate voltage of a gate terminal of the TFT 154. That is, it is possible to prevent a pixel electrode of the TFT 154 from being inadequately charged in a case where the pixel electrode should be charged at a high speed.

It is further possible to reduce manufacturing cost because it is not necessary to use high voltage-resistance components such as a driving circuit and a TFT 154. This is based on the fact that it is not necessary to increase a voltage of a scan signal, which voltage is to be applied to a gate electrode of the TFT 154, in order to prevent the drain voltage from being inadequately charged due to the shortage in ultimate voltage of the gate terminal.

Furthermore, it is possible to improve an aperture ratio because the display panel 15 has reduced load on electric wires. This is based on the fact that it is not necessary to increase the size of the TFT 154 in order to prevent the drain voltage from being inadequately charged due to the shortage in the ultimate voltage of the gate terminal.

Note that examples of the case where the pixel electrode should be charged at a high speed encompass (i) a case where a display screen is large (that is, a case where load is heavy), (ii) a case where a high resolution is required, (iii) a case where a high frame rate is required and (iv) a case where a 3D display is carried out by means of driving such as driving of a parallax barrier system. Note, however, that the examples are not limited to such.

Note also that it is preferable that the intermediate electric potential Vg1' is more than the L-level voltage Vg1 but less than a minimum voltage Vs1 of video signals.

This causes a gate-source voltage Vgs to be not more than 0 V (zero volt) (Vgs≤0 V (Vg1'<Vs1)). Note that, in a case where (i) the TFT 154 has a TFT property necessary for driving a pixel of a typical display device and (ii) Vgs≤0 V (zero volt), a resistance between a source and a drain becomes high (that is, the TFT 154 is in an OFF state). This causes a voltage of a pixel electrode 155 to be prevented from remarkably fluctuating during the first scan, in a case where the intermediate electric potential Vg1' is less than the minimum voltage Vs1 of the video signals. As such, it is possible to suppress a reduction in display quality.

[Modification]

Embodiment 1 has described an example configuration in which a first scan is carried out before a second scan, during scanning of each scan line 151, so that corresponding pixel electrodes 155 are prevented from being adequately charged. The present invention is, however, not limited to such an example configuration. For example, in a case where a primary scan includes a first scan and a second scan, a preliminary scan can be further carried out in which the corresponding pixel electrodes 155 are preliminarily charged by scanning each scan line 151 before the primary scan. In a case where the preliminary scan is carried out before the primary scan, each scan line 151 is subject to twice-scan, i.e., the preliminary scan and the primary scan, during one (1) frame period.

Electric charges, charged on a pixel electrode 155 during the preliminarily scan, start to be discharged from when the preliminary scan is completed. However, in a case where the primary scan is started before the electric charges are completely discharged, it is possible to start charging, during the primary scan, the pixel electrode 155 from a voltage that is reduced, by a voltage corresponding to an amount of discharged electric charges, from a charged voltage during the preliminary scan. This makes it possible to shorten a time period required for charging the pixel electrode 155 during the primary scan, as compared with a case where no preliminary scan is carried out.

(Operation of Driver Device)

Figure 8:
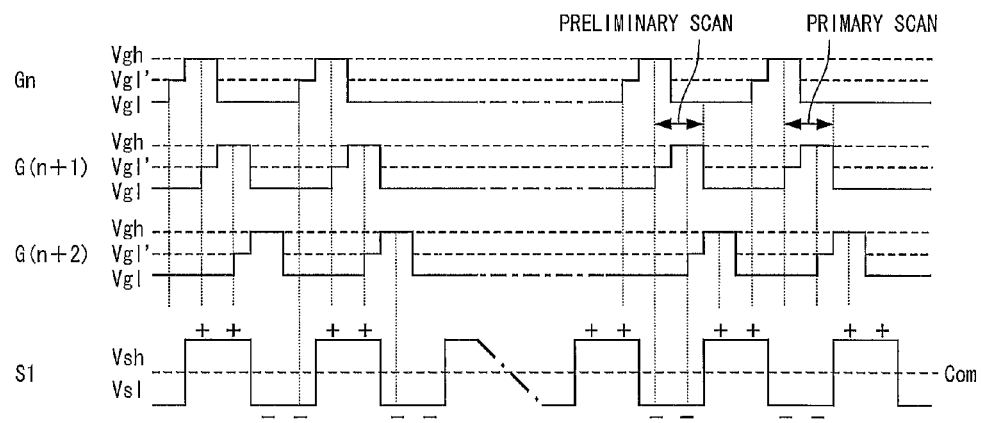
FIG. 8 is a timing chart, in a modification of an embodiment of the present invention, which illustrates a relationship between scan signals and a video signal.

Modification will describe below, with reference to FIG. 8, a configuration in which a preliminary scan is carried out with respect to a scan line 151 before a primary scan. FIG. 8 is a timing chart which illustrates a relationship between scan signals and a video signal in a driver device 10 of the present modification.

A scan line driving circuit 12 included in the driver device 10 of Modification carries out a preliminary scan in which a scan signal is supplied to an $n^{th}$ scan line 151, before a primary scan (i) which includes a first scan and a second scan and (ii) in which the $n^{th}$ scan line 151 is scanned (see FIG. 8).

A preliminary scan includes a first preliminary scan and a second preliminary scan. According to the first preliminary scan, a preliminary scan is carried out with respect to an $(n+1)^{th}$ scan line 151, while a preliminary scan for the $n^{th}$ scan line 151 is being superimposed on the preliminary scan for the $(n+1)^{th}$ scan line 151, until the preliminary scan for the $n^{th}$ scan line 151 is completed. According to the second preliminary scan, a preliminary scan is carried out with respect to the $(n+1)^{th}$ scan line 151 when the preliminary scan for the $n^{th}$ scan line 151 is completed (see FIG. 8).

Note that it is necessary that (i) a preliminary scan signal to be supplied during the first preliminary scan has an intermediate electric potential Vg1' which is equal to that of a scan signal to be supplied during the first scan and (ii) a preliminary scan signal to be supplied during the second preliminary scan has an H-level voltage Vgh.

(Configuration of Timing Control Circuit)

Note that, in order to generate a preliminary scan signal, the timing control circuit 11, which is included in the driver device 10 of Modification, (i) externally receives (a) synchronization signals, (b) gate clock signals, and (c) preliminary scan control signals (later described) for controlling a timing of a preliminary scan and (ii) outputs control signals for controlling the display panel 15 to display an image. Specifically, the timing control circuit 11 supplies, to the scan line driving circuit 12, scan control signals (later described), gate clock signals, gate start pulse signals, and preliminary scan control signals. The timing control circuit 11 supplies, to a video signal line driving circuit 13, source clock signals, source start pulse signals, and latch strobe signals.

The scan line driving circuit 12 receives, from the timing control circuit 11, (i) scan control signals Gs1 through Gs4, (ii) gate clock signals CK1 and CK2, (iii) gate start pulse signals SP1 and SP2 and (iv) the preliminary scan control signals. The scan line driving circuit 12 then supplies, to the scan lines 151 that are included in the display panel 15, scan signals and preliminary scan signals in response to the signals from the timing control circuit 11.

(Configuration of Scan Line Driving Circuit)

The scan drive controlling section 121, which is included in the scan line driving circuit 12 of the driver device 10 of Modification, supplies (i) scan control signals Gs1 through Gs4, (ii) gate clock signals CK1 and CK2, (iii) gate start pulse signals SP1 and SP2 and (iv) preliminary scan control signals, to a shift register group 122 in accordance with (a) the scan control signals, (b) the gate clock signals, (c) the gate start pulse signals, and (d) the preliminary scan signals, which have been supplied from the timing control circuit 11.

The shift register group 122 includes (i) a plurality of set/reset type flip flops and (ii) a plurality of switching circuits. The shift register group 122 supplies scan control signals Gs1 through Gs4 to the shift register group 122. Specifically, upon receipt of gate start pulse signals SP from the scan drive controlling section 121, the shift register group 122 supplies the scan control signals Gs1 through Gs4, in synchronization with gate clock signals CK, to a level shifter group 123 via respective output terminals that are connected to the level shifter group 123. Upon receipt of gate start pulse signals SP from the scan drive controlling section 121, the shift register group 122 supplies preliminary scan control signals, in synchronization with gate clock signals CK, to the level shifter group 123 via the respective output terminals that are connected to the level shifter group 123.

The level shifter group 123, which includes a plurality of level shifter circuits, generates scan signals in response to the scan control signals Gs1 through Gs4 which have been supplied from the shift register group 122. The level shifter group 123 also generates preliminary scan signals in response to the preliminary scan control signals which have been supplied from the shift register group 122.

For example, a preliminary scan control signal can contain four kinds of signals, like the scan control signal. In this case, as with the case where the scan signals are generated (see FIG. 4), the level shifter group 123 (i) generates, on the basis of two of the four kinds of signals, a preliminary scan signal to be supplied to the $n^{th}$ scan line 151 and (ii) generates, on the basis of the other two of the four kinds of signals, a preliminary scan signal to be supplied to the $(n+1)^{th}$ scan line 151. Note that a preliminary scan signal is a ternary signal, i.e., Vg1, Vg1' or Vgh.

The level shifter group 123 (i) combines a scan signal and a preliminary scan signal, which have been generated to scan an identical scan line 151, so as to generate a scan signal (hereinafter, referred to also as a composite scan signal) and then (ii) supplies the composite scan signal to an output circuit section 124.

The output circuit section 124 is provided for sequentially supplying, to scan lines 151 included in the display panel 15, composite scan signals which have been supplied from the level shifter group 123.

Note that Modification has described an example case where (i) the level shifter group 123 combines the scan signal and the preliminary scan signal, which have been generated to scan the identical scan line 151, so as to generate the composite scan signal and then (ii) the composite scan signal is outputted via the output circuit section 124. Note, however, that the present invention is not limited to such an example case. For example, a configuration can be employed in which the scan signal and the preliminary scan signal, which have been generated by the level shifter group 123 and scan the identical scan line 151, are independently outputted via the output circuit section 124.

Note that it is more preferable that a timing at which a preliminary scan signal is supplied to a scan line 151 is identical to a timing at which a video signal is supplied to a corresponding video signal line 152 before a primary scan, the video signal having the same polarity as a video signal to be supplied to the corresponding video signal 152 during the primary scan.

According to the arrangement, a TFT 154, that is connected to the scan line 151 which has been subjected to a preliminarily scan, is turned ON only for a certain period of time before the primary scan. This allows a voltage, by which a pixel electrode 155, connected to a drain terminal of the TFT 154, is charged, to get closer in advance from a current charging voltage to a voltage by which the pixel electrode 155 is to be charged during the primary scan. This causes shortening of a time period required for a charging voltage of the pixel electrode 155 to reach a source voltage Vs. It is therefore possible to further prevent the pixel electrode 155 from being inadequately charged.

Note that Embodiment 1 has described an example case where (i) a first preliminary scan is carried out with respect to the $(n+1)^{th}$ scan line 151 while a preliminary scan for the $n^{th}$ scan line 151 is being superimposed on the first preliminary scan and (ii) a second preliminary scan is carried out with respect to the $(n+1)^{th}$ scan line 151 when the preliminary scan for the $n^{th}$ scan line 151 is completed. The present invention is, however, not limited to such an example case. For example, a first preliminary scan can be carried out with respect to an $(n+m)^{th}$ scan line 151 while a preliminary scan for the $n^{th}$ scan line 151 is being superimposed on the first preliminary scan, and a second preliminary scan can be carried out with respect to the $(n+m)^{th}$ scan line 151 when the preliminary scan for the $n^{th}$ scan line 151 is completed.

Embodiment 2

Embodiment 1 has described an example case where (i) a first scan is carried out with respect to the $(n+1)^{th}$ scan line 151 while scanning of the $n^{th}$ scan line 151 is being superimposed on the first scan and (ii) a second scan is carried out with respect to the $(n+1)^{th}$ scan line 151 when the scanning of the $n^{th}$ scan line 151 is completed. The present invention, however, is not limited to such an example case. For example, a first scan can be carried out with respect to an $(n+m)^{th}$ scan line 151 (m: positive integer) while scanning of the $n^{th}$ scan line 151 is being superimposed on the first scan, and a second scan can be carried out with respect to the $(n+m)^{th}$ scan line 151 when the scanning of the $n^{th}$ scan line 151 is completed.

Figure 9:
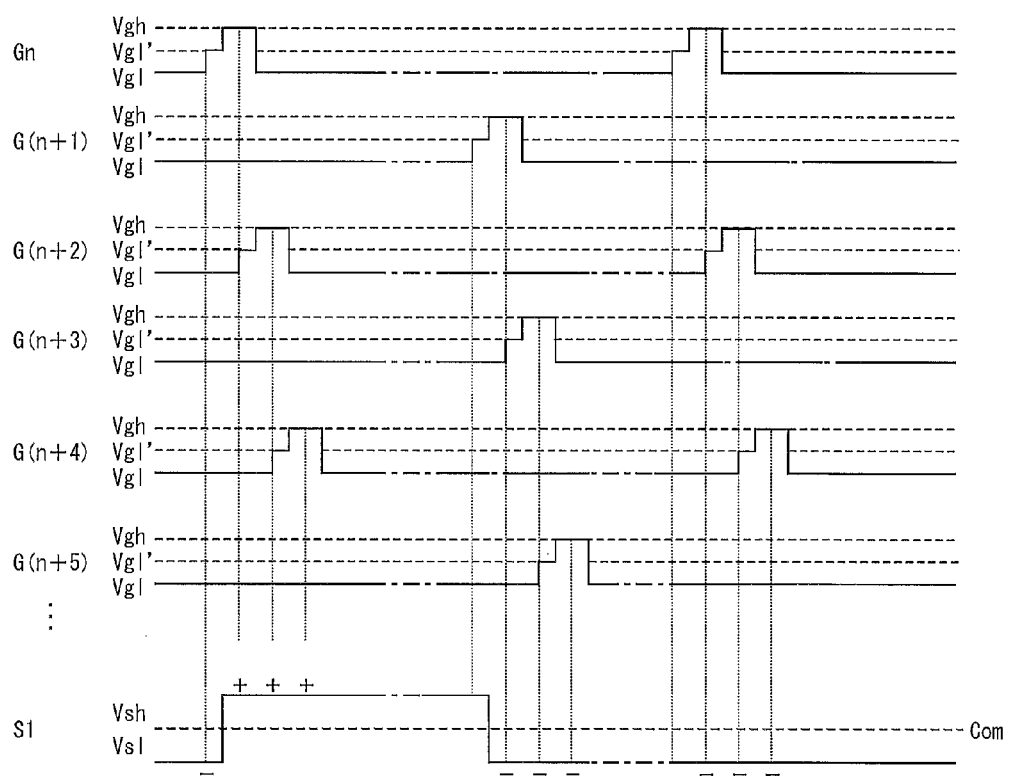
FIG. 9 is a timing chart, in accordance with another embodiment of the present invention, which illustrates a relationship between scan signals and a video signal.

Embodiment 2 will describe below a case where m is 2, with reference to FIG. 9. FIG. 9 is a timing chart, in Embodiment 2, which illustrates a relationship between scan signals and a video signal.

A scan line driving circuit 12 carries out a first scan in which a scan signal G(n+2) of Vg1' is supplied to an $(n+2)^{th}$ scan line 151 while scanning of the $(n+2)^{th}$ scan line 151 is being superimposed on scanning in which a scan signal Gn scans an $n^{th}$ scan line 151. The scan line driving circuit 12 then carries out a second scan in which a scan signal G(n+2) of Vgh is supplied to the $(n+2)^{th}$ scan line 151, when scanning of the $n^{th}$ scan line 151 is completed.

In this case, a level shifter group 123 generates (i) a scan signal that supplies an intermediate electric potential Vg1' to the $(n+m)^{th}$ scan line 151 while scanning of the $(n+m)^{th}$ scan line 151 is being superimposed on scanning of the $n^{th}$ scan line 151 and (ii) a scan signal that supplies an H-level voltage Vgh to the $(n+m)^{th}$ scan line 151 when the scanning of the $n^{th}$ scan line 151 is completed.

Embodiment 3

Embodiment 1 has described an example configuration in which, regardless of a polarity of a video signal, a first scan is carried out with respect to the $(n+1)^{th}$ scan line 151 while scanning of the $n^{th}$ scan line 151 is being superimposed on the first scan. The present invention is, however, not limited to such an example configuration. For example, a configuration can be employed in which a first scan is carried out only in a case where a polarity of a supplied video signal is reversed.

Figure 10:
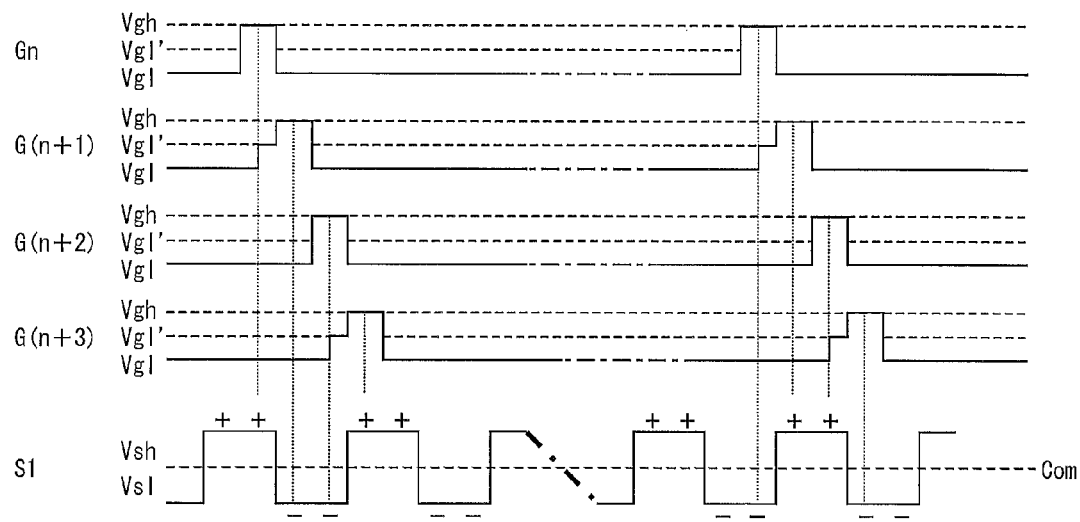
FIG. 10 is a timing chart, in accordance with another embodiment of the present invention, which illustrates a relationship between scan signals and a video signal.

Embodiment 3 will describe below, with reference to FIG. 10, a configuration in which (i) in a case where a polarity of a supplied video signal is reversed, a first scan is carried out while scanning of an $n^{th}$ scan line 151 is being superimposed the first scan and, in contrast, (ii) in a case where the polarity of the supplied video signal is not reversed, only a second scan is carried out from the time when the scanning of the $n^{th}$ scan line 151 is completed. FIG. 10 is a timing chart, in Embodiment 3, which illustrates a relationship between scan signals and a video signal.

A polarity of a video signal S1, to be supplied from a video signal line driving circuit 13 that is included in a driver device 10 of Embodiment 3, changes from positive one to negative one at a transition from scanning of an $n^{th}$ scan line 151 to scanning of an $(n+1)^{th}$ scan line 151 (see FIG. 10). The polarity of the video signal S1 changes from negative one to positive one at a transition from scanning of an $(n+2)^{th}$ scan line 151 to scanning of an $(n+3)^{th}$ scan line 151. In contrast, the polarity of the video signal S1 does not change at a transition from the scanning of the $(n+1)^{th}$ scan line 151 to the scanning of the $(n+2)^{th}$ scan line 151.

In a case of the transition from the scanning of the $n^{th}$ scan line 151 to the scanning of the $(n+1)^{th}$ scan line 151, the scan line driving circuit 12 (i) carries out a first scan with respect to the $(n+1)^{th}$ scan line 151 while the scanning of the $n^{th}$ scan line 151 is being superimposed on the first scan and then (ii) starts a second scan when the scanning of the $n^{th}$ scan line 151 is completed (see FIG. 10). In a case of the transition from the scanning of the $(n+2)^{th}$ scan line 151 to the scanning of the $(n+3)^{th}$ scan line 151, the scan line driving circuit 12 (i) carries out a first scan with respect to the $(n+3)^{th}$ scan line 151 while the scanning of the $n^{th}$ scan line 151 is being superimposed on the first scan and then (ii) starts a second scan when the scanning of the $n^{th}$ scan line 151 is completed. In contrast, the scan line driving circuit 12 does not carry out any first scan with respect to the $(n+2)^{th}$ scan line 151 during the scanning of the $(n+1)^{th}$ scan line 151, whereas starts carrying out a second scan with respect to the $(n+2)^{th}$ scan line 151 when the scanning of the $(n+1)^{th}$ scan line 151 is completed.

According to the configuration, no first scan needs to be carried out in a case where the polarity of the video signal S1 to be supplied to a video signal line 152 is not reversed. This is based on the following facts (i) and (ii): (i) in a case where the polarity of a video signal S1 is not reversed, a corresponding pixel electrode 155 which was positively charged merely needs to be positively charged, whereas (ii) in a case where the polarity of the video signal S1 is reversed, the corresponding pixel electrode 155 which was positively charged should be negatively charged and vice versa.

This makes it possible to reduce a difference in time period required for charging the pixel electrode 155 between the case where the polarity of the video signal S1 is reversed and the case where the polarity of the video signal S1 is not reversed. Examples of a driving method, in which reversal and non-reversal of a polarity of a video signal S1 are repetitively carried out, include an n-dot-reversal driving method. Note, however, that the driving method is not limited to such an n-dot-reversal driving method.

Embodiment 4

Embodiment 1 has described an example case where an intermediate electric potential Vg1' to be supplied during a first scan is an intermediate electric potential between an L-level voltage Vg1 and an H-level voltage Vgh. The present invention, however, is not limited to such an example case. For example, an alternative configuration can be employed in which the intermediate electric potential Vg1' is a ground electric potential, that is, the intermediate electric potential Vg1' is equal to 0 V (zero volt).

Figure 11:
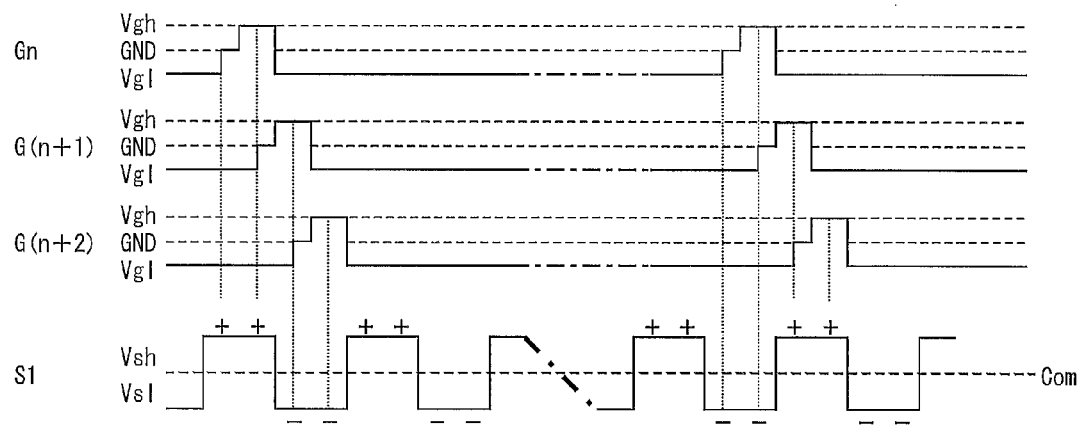
FIG. 11 is a timing chart, in accordance with another embodiment of the present invention, which illustrates a relationship between scan signals and a video signal.

Embodiment 4 will describe below, with reference to FIG. 11, a case where an intermediate electric potential Vg1' is a ground electric potential. FIG. 11 is a timing chart, in Embodiment 4, which illustrates a relationship between scan signals and a video signal.

A scan signal, to be supplied, during a first scan period during which a first scan is carried out, from a scan line driving circuit 12 that is included in a driver device 10 of Embodiment 4, becomes GND (ground electric potential: 0 V) (see FIG. 11).

According to the configuration, the intermediate electric potential Vg1' is equal to 0 V (zero volt). It is therefore not necessary to separately provide any electric power supply circuit for the first scan. This allows a reduction in cost. Further, since the intermediate electric potential Vg1' is equal to 0 V (zero volt), it is possible to realize low-power-consumption driving. This allows a reduction in power consumption.

Embodiment 5

Embodiment 1 has described an example case where a first scan period is fixed. Note, however, that the present invention is not limited to such an example case. Alternatively, the first scan period can be optionally changed for each scan line 151. Specifically, the present invention can employ, for example, a configuration in which the first scan period is lengthened in a case where a polarity of a video signal is reversed, whereas the first scan period is shortened in a case where the polarity of the video signal is not reversed.

Figure 12:
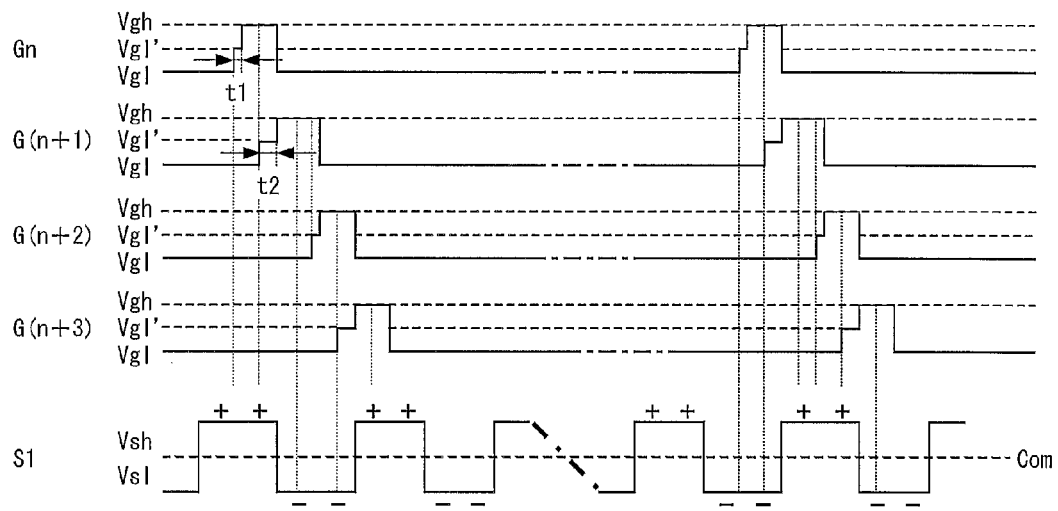
FIG. 12 is a timing chart, in accordance with another embodiment of the present invention, which illustrates a relationship between scan signals and a video signal.

Embodiment 5 will describe below, with reference to FIG. 12, the configuration in which a first scan period is lengthened in a case where a polarity of a video signal is reversed, whereas the first scan period is shortened in a case where the polarity of the video signal is not reversed. FIG. 12 is a timing chart, in Embodiment 5, which illustrates a relationship between scan signals and a video signal.

A polarity of a video signal S1, to be supplied from a video signal line driving circuit 13 that is included in a driver device 10 of Embodiment 5, changes from positive one to negative one at a transition from scanning of an $n^{th}$ scan line 151 to scanning of an $(n+1)^{th}$ scan line 151 (see FIG. 12). The polarity of the video signal S1 changes from negative one to positive one at a transition from scanning of an $(n+2)^{th}$ scan line 151 to scanning of an $(n+3)^{th}$ scan line 151. In contrast, the polarity of the video signal S1 does not change at a transition from the scanning of the $(n+1)^{th}$ scan line 151 to the scanning of the $(n+2)^{th}$ scan line 151.

During the scanning of the $n^{th}$ scan line 151, a scan line driving circuit 12 carries out a first scan with respect to the $n^{th}$ scan line 151 for a short period of time t1, and then starts a second scan with respect to the $n^{th}$ scan line 151 when the first scan is completed (see FIG. 12). In a case of the transition from the scanning of the $n^{th}$ scan line 151 to the scanning of the $(n+1)^{th}$ scan line 151, the scan line driving circuit 12 (i) carries out a first scan with respect to the $(n+1)^{th}$ scan line 151 for a long period of time t2 while the scanning of the $n^{th}$ scan line 151 is being superimposed on the first scan and then (ii) starts a second scan with respect to the $(n+1)^{th}$ scan line 151 when the first scan is completed. In a case of the transition from the scanning of the $(n+1)^{th}$ scan line 151 to the scanning of the $(n+2)^{th}$ scan line 151, the scan line driving circuit 12 (i) carries out a first scan with respect to the $(n+2)^{th}$ scan line 151 for a short period of time t1 while the scanning of the $(n+1)^{th}$ scan line 151 is being superimposed on the first scan and then (ii) starts a second scan with respect to the $(n+2)^{th}$ scan line 151 when the first scan is completed.

Note that, in a case where a first scan period is changed for each scan line 151, a level shifter group 123 included in the scan line driving circuit 12 generates, in response to a scan control signal supplied from the shift register group 122, a scan signal having a first scan period whose time length corresponds to scanning of each scan line 151.

In a case where the level shifter group 123 generates a scan signal having a long first scan period, (i) a scan control signal Gs1 (or a scan control signal Gs3) keeps an H-level and (ii) a scan control signal Gs2 (or a scan control signal Gs4) keeps an L-level for a long period of time. In contrast, in a case where the level shifter group 123 generates a scan signal having a short first scan period, (i) a scan control signal Gs1 (or a scan control signal Gs3) keeps an H-level and (ii) a scan control signal Gs2 (or a scan control signal Gs4) keeps an L-level for a short period of time.

Note that whether or not a polarity of a video signal S1 is reversed during a first scan and a second scan for a scan line 151 is made clear in advance. Therefore, in a case of controlling the length of a first scan period, the scan line driving circuit 12 controls signal levels of scan control signals Gs1 through Gs4 on the basis of information (hereinafter, referred to also as polarity reversal information), which has been made clear in advance, on whether or not the polarity of the video signal S1 is reversed at a transition from the first scan to the second scan.

According to the configuration, the scan line driving circuit 12 can carry out a first scan for a long period of time in a case of a polarity reversal of a video signal, which case needs a long first scan period of time. In contrast, the scan line driving circuit 12 can carry out the first scan only for a short period of time in a case of no polarity reversal of the video signal, which case needs merely a short first scan period of time.

This makes it possible to (i) prevent a pixel electrode 155 from being inadequately charged and (ii) suppress a fluctuation in charging voltage of the pixel electrode 155.

[Modification]

Embodiment 1 has described an example case where an intermediate electric potential is constant during a first scan for each scan line 151. The present invention, however, is not limited to such an example case. The intermediate electric potential can be optionally changed for the each scan line 151. For example, an alternative configuration can be employed in which an intermediate electric potential is increased in a case where a polarity of a video signal is reversed, and, in contrast, the intermediate electric potential is decreased in a case where the polarity of the video signal is not reversed.

Figure 13:
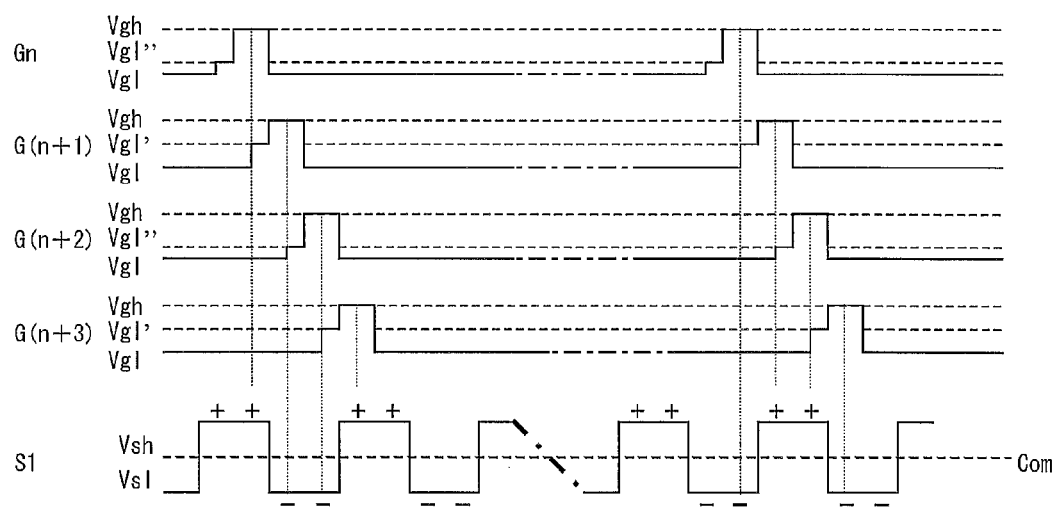
FIG. 13 is a timing chart, in accordance with another embodiment of the present invention, which illustrates a relationship between scan signals and a video signal.

Modification will describe below, with reference to FIG. 13, the configuration in which an intermediate electric potential is increased in a case where a polarity of a video signal is reversed, and, in contrast, the intermediate electric potential is decreased in a case where the polarity of the video signal is not reversed. FIG. 13 is a timing chart, in Modification, which illustrates a relationship between scan signals and a video signal.

A polarity of a video signal S1, to be supplied from a video signal line driving circuit 13 that is included in a driver device 10 of Modification, changes from positive one to negative one at a transition from scanning of an $n^{th}$ scan line 151 to scanning of an $(n+1)^{th}$ scan line 151 (see FIG. 13). The polarity of the video signal S1 changes from negative one to positive one at a transition from scanning of an $(n+2)^{th}$ scan line 151 to scanning of an $(n+3)^{th}$ scan line 151. In contrast, the polarity of the video signal S1 does not change at a transition from the scanning of the $(n+1)^{th}$ scan line 151 to the scanning of the $(n+2)^{th}$ scan line 151.

During scanning of the $n^{th}$ scan line 151, the scan line driving circuit 12 (i) carries out a first scan with respect to the $n^{th}$ scan line 151, in which first scan a scan signal, which has a small intermediate electric potential Vg1", is supplied to the $n^{th}$ scan line 151 and (ii) starts a second scan with respect to the $n^{th}$ scan line 151 when the first scan is completed (see FIG. 13). In a case of the transition from the scanning of the $n^{th}$ scan line 151 to the scanning of the $(n+1)^{th}$ scan line 151, the scan line driving circuit 12 (i) carries out a first scan with respect to the $(n+1)^{th}$ scan line 151, in which first scan a scan signal, which has a large intermediate electric potential Vg1', is supplied to the $(n+1)^{th}$ scan line 151 while the scanning of the $n^{th}$ scan line 151 is being superimposed on the first scan and (ii) starts a second scan with respect to the $(n+1)^{th}$ scan line 151 when the first scan is completed. In a case of the transition from the scanning of the $(n+1)^{th}$ scan line 151 to the scanning of the $(n+2)^{th}$ scan line 151, the scan line driving circuit 12 (i) carries out a first scan with respect to the $(n+2)^{th}$ scan line 151, in which first scan a scan signal, which has the small intermediate electric potential Vg1", is supplied to the $(n+2)^{th}$ scan line 151 while the scanning of the $(n+1)^{th}$ scan line 151 is being superimposed on the first scan and (ii) starts a second scan with respect to the $(n+2)^{th}$ scan line 151 when the first scan is completed.

Note that, in a case where an intermediate electric potential is changed, during a first scan, for each scan line 151, a level shifter group 123 included in the scan line driving circuit 12 determines, on the basis of (i) a scan control signal supplied from a shift register group 122 and (ii) polarity reversal information of a video signal S, which one of an intermediate electric potential Vg1' and an intermediate electric potential Vg1" should be generated.

More specifically, in a case where a video signal S1 has a polarity during a first scan, identical to a polarity which the video signal S1 has during a second scan, the level shifter group 123 included in the scan line driving circuit 12 selects, as the intermediate electric potential, the small intermediate electric potential Vg1" used during the first scan, and thus generates a scan signal having such a small intermediate electric potential. In contrast, in a case where the video signal S1 has a polarity during a first scan, reversed from a polarity which the video signal S1 has during a second scan, the level shifter group 123 selects, as the intermediate electric potential, the large intermediate electric potential Vg1' used during the first scan, and thus generates a scan signal having such a large intermediate electric potential Vg1'.

According to the configuration, the scan line driving circuit 12 can carry out a first scan with use of a large intermediate electric potential in a case of a polarity reversal of a video signal, which case needs the large intermediate electric potential during the first scan. In contrast, the scan line driving circuit 12 can carry out the first scan with use of a small intermediate electric potential in a case of no polarity reversal of the video signal, which case needs the small intermediate electric potential (in other words, which case does not need the large intermediate electric potential) during the first scan.

This makes it possible to (i) prevent a pixel electrode 155 from being inadequately charged and (ii) suppress a fluctuation in charging voltage of the pixel electrode 155.

Embodiment 6

Embodiment 1 has described an example case where a voltage, to be supplied during a second scan, is constant (an H-level voltage Vgh). The present invention is, however, not limited to such an example case. For example, an alternative configuration can be employed in which the voltage to be supplied during the second scan is reduced at a slant from the H-level voltage Vgh to a predetermined voltage before the second scan is completed.

Embodiment 6 will describe below, with reference to FIG. 14, a configuration in which a scan line driving circuit 12 reduces, before a second scan is completed, at a slant a voltage, which is to be supplied during the second scan, from an H-level voltage Vgh. FIG. 14 is a timing chart, in Embodiment 6, which illustrates a relationship between scan signals and a video signal.

The scan line driving circuit 12 causes a falling edge of a scan signal to get dull, by reducing, before the second scan is completed, at a slant the voltage, which is to be supplied during the second scan, from the H-level voltage Vgh (see FIG. 14).

Note that, in order that the voltage to be supplied during the second scan is reduced at a slant from the H-level voltage Vgh, an output circuit section 124 further includes a slew rate control circuit for controlling a falling rate of the scan signal.

The slew rate control circuit is equivalent to an output impedance controlling device for controlling each impedance of outputs of the scan line driving circuit 12. The slew rate control circuit increases the output impedance of the scan line driving circuit 12 only at a falling edge of a scan line to be supplied to a scan line 151. This causes output waveforms themselves of the scan line driving circuit 12 to get dull.

According to the configuration, the scan signal to be supplied during the second scan is thus reduced at a slant from the H-level voltage Vgh. This makes it possible to (i) prevent a pixel electrode 155 from being inadequately charged and (ii) prevent the scan signal from steeply falling. It is therefore possible to alleviate a reduction (that is, a level shift) in charging voltage of the pixel electrode 155 due to a parasitic capacitance which is formed by a gate and a drain of a corresponding TFT 154. This can ultimately prevent (i) a flicker in image to be displayed and (ii) a deterioration in display (including display defects such as afterimage).

Embodiment 7

(TFT)

Embodiment 1 has described an example case where the semiconductor layer of the TFT 154 is made of a-Si. The present invention is, however, not limited to such an example case. It is more preferable that, for example, the semiconductor layer of the TFT 154 is made of an oxide semiconductor or p-Si.

Embodiment 7 will describe below, with reference to FIGS. 15 and 16, a case where a semiconductor layer of a TFT 154 is made of an oxide semiconductor or p-Si (Polycrystalline Silicon).

FIG. 15 is a graph illustrating (i) a dependency of a drain current Id on a gate-source voltage Vgs in a TFT 154 whose semiconductor layer is made of an oxide semiconductor or p-Si and (ii) a dependency of √Id (the square root of the drain current Id) on the gate-source voltage Vgs in the TFT 154. FIG. 16 is a timing chart, in Embodiment 7, which illustrates a relationship between a scan signal and a video signal.

In FIG. 15, (a) and (b) represent a Vgs-Id property and a Vgs-√Id property, respectively, of the TFT 154 whose semiconductor layer is made of the oxide semiconductor. In FIG. 15, (c) and (d) represent a Vgs-Id property and a Vgs-√Id property, respectively, of the TFT 154 whose semiconductor layer is made of the p-Si. In FIG. 15, (e) and (f) represent a Vgs-Id property and a Vgs-√Id property, respectively, of the TFT 154 whose semiconductor layer is made of a-Si (a semiconductor that is a material for a general TFT).

In a case where the gate-source voltage Vgs is 0 V (zero volt), the drain current Id in the TFT 154 whose semiconductor layer is made of oxide semiconductor or p-Si is smaller than that in the TFT whose semiconductor layer is made of a-Si (see FIG. 15). Within a range where the gate-source voltage Vgs is smaller than 0 V (zero volt), the drain current Id, in the TFT 154 whose semiconductor layer is made of a-Si, increases as the gate-source voltage Vgs becomes smaller than 0 V (zero volt). On the other hand, the drain current Id, in the TFT 154 whose semiconductor layer is made of oxide semiconductor or p-Si, is stable.

Figure 16:
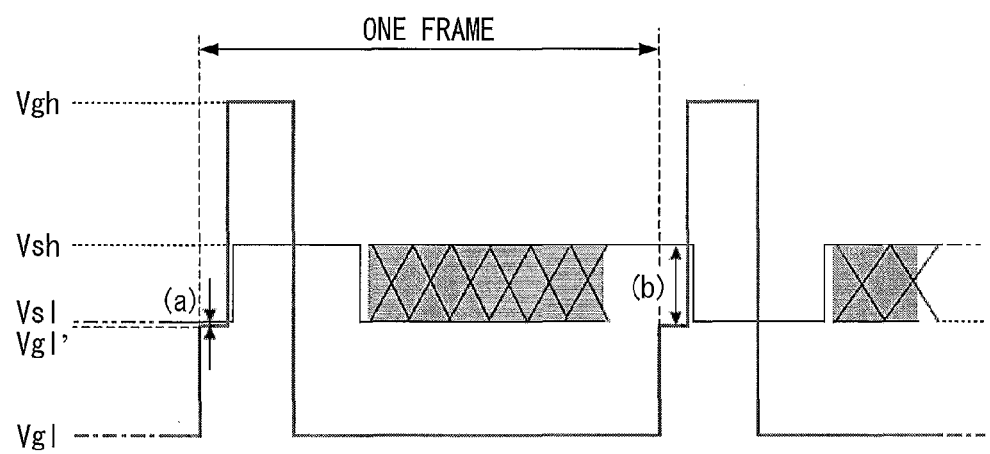
FIG. 16 is a timing chart, in accordance with another embodiment of the present invention, which illustrates a relationship between a scan signal and a video signal.

A video signal, which is to be applied to a source terminal during a first scan period, differs from frame to frame (see FIG. 16). The video signal to be applied to the source terminal can be, for example, a minimum voltage Vsl (that is, Vgs=−(Vsl−Vg1')≈0 (V)) of the video signal (see (a) in FIG. 16) or a maximum voltage Vsh (that is, Vgs=−(Vsh−Vg1')<0 (V)) of the video signal (see (b) in FIG. 16).

The drain current Id, in the TFT 154 whose semiconductor layer is made of a-Si, is (i) large (see FIG. 15) in a case where Vgs≈0 (V) ((a) in FIG. 16) and (ii) unstable (see FIG. 15) in a case where Vgs<0 (V) ((b) in FIG. 16). The drain current Id flowing in a case where Vgs≈0 (V) ((a) in FIG. 16) thus differs from the drain current Id flowing in a case where Vgs<0 (V) ((b) in FIG. 16).

On the other hand, the drain current Id, in the TFT 154 whose semiconductor layer is made of oxide semiconductor or p-Si, is (i) approximately 0 V (see FIG. 15) in a case where Vgs≈0 (V) ((a) in FIG. 16) and (ii) stable and approximately 0 V (see FIG. 15) in a case where Vgs<0 (V) ((b) in FIG. 16). The drain current Id flowing in a case where Vgs≈0 (V) ((a) in FIG. 16) is thus substantially equal to the drain current Id flowing in a case where Vgs<0 (V) ((b) in FIG. 16).

As is clear from above, in a case where the gate-source voltage Vgs is not more than 0 V (zero volt), the drain current, in the TFT 154 whose semiconductor layer is made of oxide semiconductor or p-Si, is smaller and more substantially stable than that in the TFT 154 whose semiconductor layer is made of a-Si. That is, the TFT 154 whose semiconductor layer is made of oxide semiconductor or p-Si is unlikely to be affected by a difference in a gate-source voltage in a case where Vgs≤0 V. It is therefore possible to reduce a fluctuation in electric potential of a pixel electrode 155 of the TFT 154. This ultimately allows an improvement in display quality.

Note that examples of the oxide semiconductor of which the semiconductor layer of the TFT 154 is made encompass IGZO (In—Ga—Zn—O; indium gallium zinc oxide) and ZnO (zinc oxide). Note, however, that the oxide semiconductor is not limited to such examples.

Embodiment 8

Modification of Embodiment 1 has described an example case where a preliminary scan is carried out with respect to each scan line 151 before a primary scan. The present invention, however, is not limited to such an example case. For example, an alternative configuration can be employed in which a preliminary scan, which started to be carried out before a primary scan, continues to be carried out until the primary scan is started.

Figure 17:
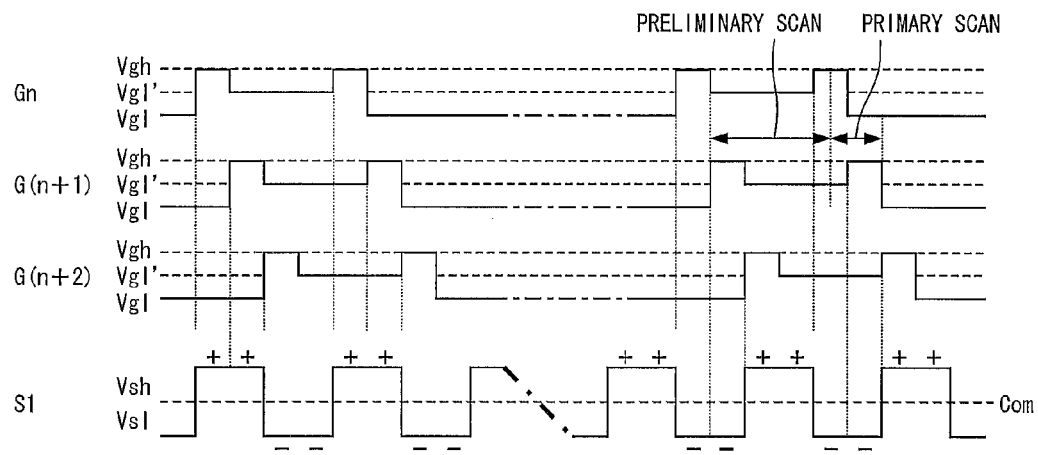
FIG. 17 is a timing chart, in accordance with another embodiment of the present invention, which illustrates a relationship between scan signals and a video signal.

Embodiment 8 will describe below, with reference FIG. 17, the configuration in which in which a preliminary scan, which started to be carried out before a primary scan, continues to be carried out until the primary scan is started. FIG. 17 is a timing chart, in Embodiment 8, which illustrates a relationship between scan signals and a video signal.

During preliminary scanning of an $n^{th}$ scan line 151, a scan line driving circuit 12 (i) first carries out a second preliminary scan in which a preliminary scan signal, which has an H-level voltage Vgh, is supplied to the $n^{th}$ scan line 151, and (ii) then starts a first preliminary scan in which a preliminary scan signal, which has an intermediate electric potential Vg1', is supplied to the $n^{th}$ scan line 151 and (iii) continues the first preliminary scan until a first scan of a primary scan is started (see FIG. 17).

In order that a level shifter group 123 generates the preliminary scan signal to be supplied during the first preliminary scan which continues to be carried out until the first scan is started, a preliminary scan control signal to be supplied to the level shifter group 123 should include (i) a first preliminary scan control signal which determines a first preliminary scan period of time and (ii) a second preliminary scan control signal which determines a second preliminary scan period of time. Note that the first preliminary scan control signal (i) keeps an H-level from the time when the second preliminary scan is started to the time when the first scan is started and (ii) changes to an L-level when the first scan is started.

Specifically, the level shifter group 123 generates the preliminary scan signal to be supplied during the second preliminary scan, during a time period (i) from the time when the first preliminary scan control signal and the second preliminary scan control signal change from the L-level to the H-level (ii) to the time when the second preliminary scan control signal changes to the L-level while the first preliminary scan control signal keeps the H-level. The level shifter group 123 generates the preliminary scan signal to be supplied during the first preliminary scan, during a time period (i) from the time when the second preliminary scan control signal changes to the L-level while the first preliminary scan control signal keeps the H-level (ii) to the time when the first preliminary scan control signal changes to the L-level (that is, to the time when a scan control signal Gs1 or Gs3 changes to the H-level).

It goes without saying that the intermediate electric potential Vg1', to be supplied during the first preliminary scan, is smaller than a gate voltage which causes a TFT 154 to be turned ON.

Note that it is more preferable that a time period, during which the second preliminary scan is carried out, falls within a time period during which a video signal, which has a polarity identical to that of a video signal to be supplied to a corresponding video signal line 152 at the time when the primary scan is carried out, is supplied.

According to the configuration, a TFT 154, which is connected to a scan line 151 which has been subjected to a second preliminary scan, is turned ON. This allows a voltage, by which a pixel electrode, connected to a drain terminal of the TFT 154, is charged, to get closer in advance from a current charging voltage to a voltage by which the pixel electrode is to be charged during the primary scan. Further, according to the configuration, a first preliminary scan is continued until a first scan is started. This allows a gate voltage of the TFT 154 to reach, in advance before a second scan, a voltage shown directly before reaching a voltage which causes the TFT to be turned ON. Therefore, even in a case where a time period, during which the second scan is carried out, is short, it is possible to increase the gate voltage of the TFT 154 up to an H-level voltage which is sufficient for the pixel electrode to be charged.

[Modification]

Modification of Embodiment 1 has described the example case where a preliminary scan is carried out with respect to each scan line 151 before a primary scan. The present invention is, however, not limited to such an example case. For example, an alternative configuration can be employed in which a preliminary scan, which started to be carried out before a primary scan, continues to be carried out until the primary scan is started.

Figure 18:
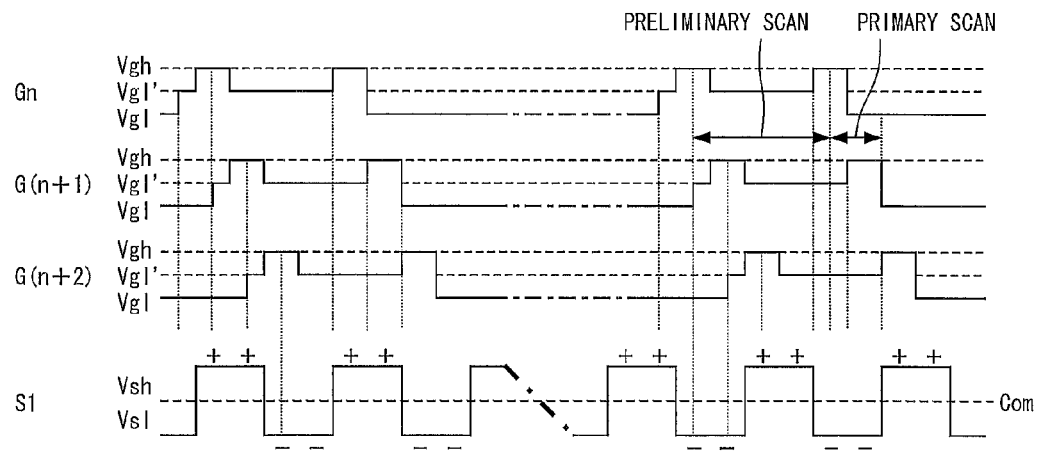
FIG. 18 is a timing chart, in a modification of another embodiment of the present invention, which illustrates a relationship between scan signals and a video signal.
Figure 21:
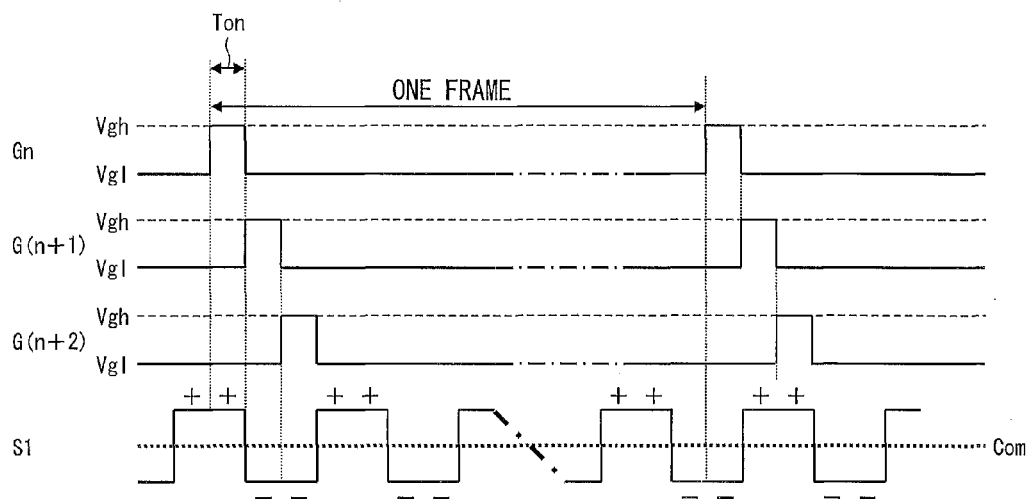
FIG. 21 is a timing chart showing ideal short waveforms of a scan signal and a video signal, which timing chart is obtained in a case where a conventional driving method is employed in which method a scan period of one scan line can be kept only short.
Figure 22:
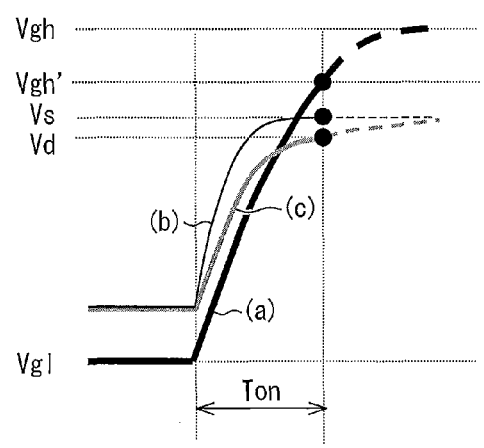
FIG. 22 is a view illustrating change in charging voltage of each terminal of a TFT during a scan period Ton.
Figure 25:
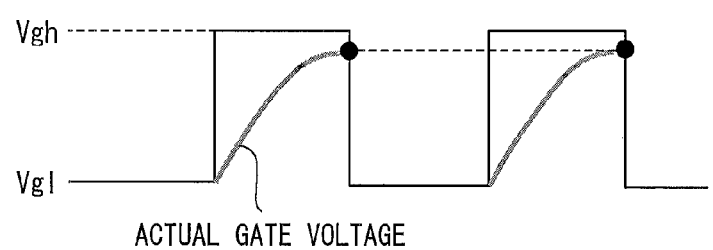
FIG. 25 is a view illustrating a change in voltage of a gate terminal in the case where the technique described in Patent Literature 1 is employed.
Figure 26:
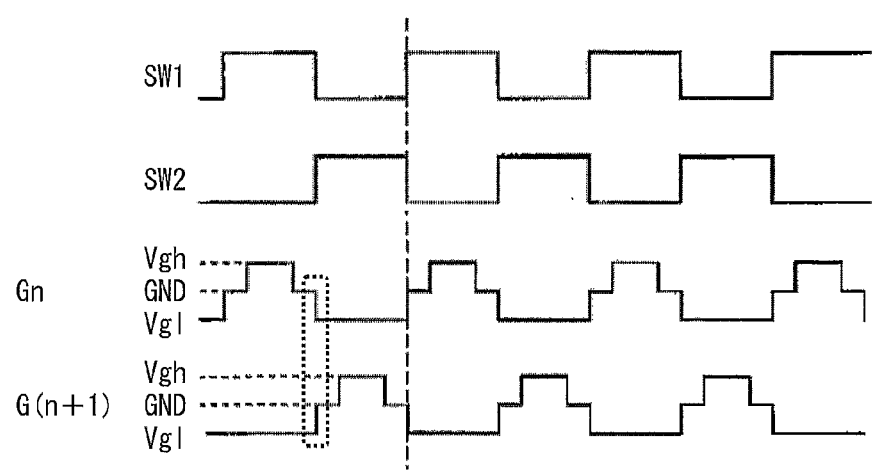
FIG. 26 is a timing chart of a scan signal and a video signal, which timing chart is obtained in a case where a technique described in Patent Literature 2 is employed.
Figure 27:
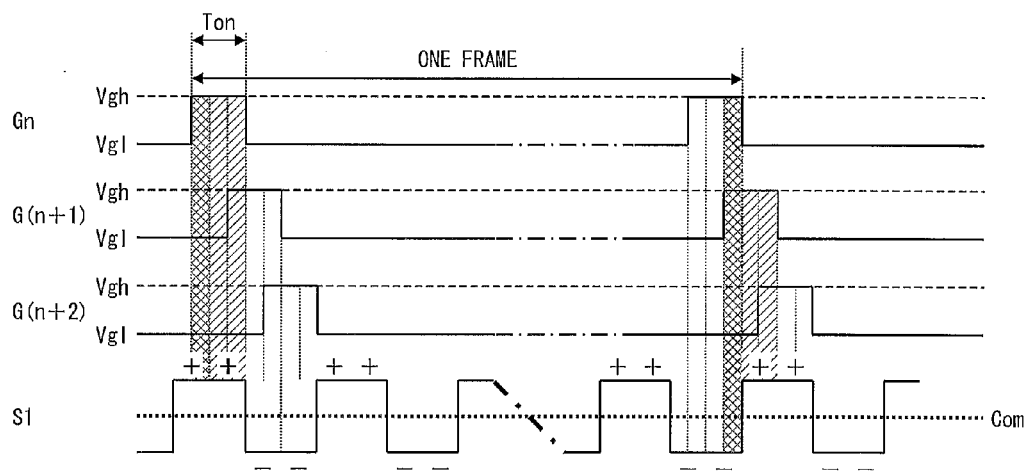
FIG. 27 is a timing chart of a scan signal and a video signal, which timing chart is obtained in a case where a technique is employed in which an $(n+1)^{th}$ scan line is scanned so that a scan period of the $(n+1)^{th}$ scan line is superimposed on a scan period of an $n^{th}$ scan line.
Figure 28:
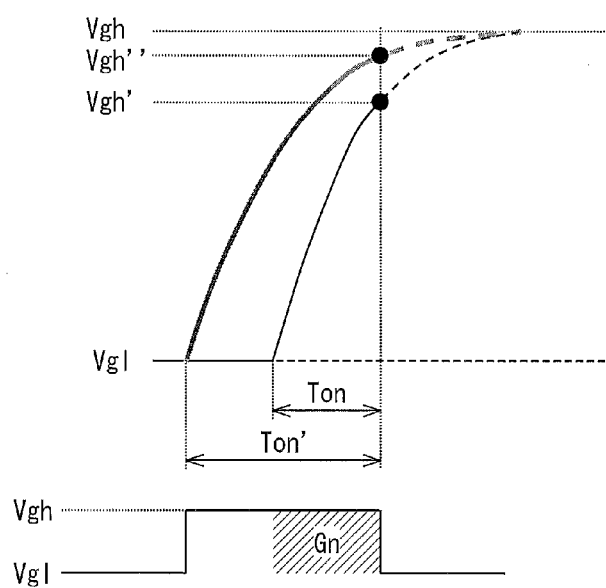
FIG. 28 is a view illustrating a change in voltage of a gate terminal in the case where the technique is employed in which the $(n+1)^{th}$ scan line is scanned so that the scan period of the $(n+1)^{th}$ scan line is superimposed on the scan period of the $n^{th}$ scan line.

This Modification will describe below, with reference FIG. 18, the configuration in which a preliminary scan, which was carried out before a primary scan, continues to be carried out until the primary scan is started. FIG. 18 is a timing chart, in the present modification, which illustrates a relationship between scan signals and a video signal.

During preliminary scanning of an $n^{th}$ scan line 151, a scan line driving circuit 12 (i) first carries out a first preliminary scan in which a preliminary scan signal, which has an intermediate electric potential Vg1', is supplied to the $n^{th}$ scan line 151 and (ii) then carries out a second preliminary scan in which a preliminary scan signal, which has an H-level voltage Vgh, is supplied to the $n^{th}$ scan line 151 (see FIG. 18). Subsequently, the scan line driving circuit 12 (i) carries out again the first preliminary scan in which the preliminary scan signal, which has the intermediate electric potential Vg1', is supplied to the $n^{th}$ scan line 151 and (ii) continues the first preliminary scan until a first scan of a primary scan is started.

In order that a level shifter group 123 generates the preliminary scan signal to be supplied during the first preliminary scan which continues to be carried out until the first scan is started, a preliminary scan control signal to be supplied to the level shifter group 123 should include (i) a first preliminary scan control signal which determines a first preliminary scan period of time and (ii) a second preliminary scan control signal which determines a second preliminary scan period of time. Note that the first preliminary scan control signal (i) keeps an H-level from the time when the second preliminary scan is started to the time when the first scan is started and (ii) changes to an L-level when the first scan is started.

Specifically, the level shifter group 123 first generates the preliminary scan signal to be supplied during the first preliminary scan, during a time period (i) from the time when the first preliminary scan control signal changes to the H-level while the second preliminary scan control signal keeps the L-level (ii) to the time when the first preliminary scan control signal and the second preliminary scan control signal change from the L-level to the H-level. The level shifter group 123 then generates the preliminary scan signal to be supplied during the second preliminary scan, during a time period (i) from the time when the first preliminary scan control signal and the second preliminary scan control signal change from the L-level to the H-level (ii) to the time when the second preliminary scan control signal changes to the L-level while the first preliminary scan control signal keeps the H-level. Subsequently, the level shifter group 123 generates the preliminary scan signal to be supplied during the first preliminary scan which continues to be carried out until the first scan is started, during a time period (i) from the time when the second preliminary scan control signal changes to the L-level while the first preliminary scan control signal keeps the H-level (ii) to the time when the first preliminary scan control signal changes to the L-level (that is, to the time when a scan control signal Gs1 or Gs3 changes to the H-level).

It goes without saying that the intermediate electric potential $Vg1'$, to be supplied during the first preliminary scans, is smaller than a gate voltage which causes a TFT 154 to be turned ON.

Note that it is more preferable that a time period, during which the second preliminary scan is carried out, falls within a time period during which a video signal, which has a polarity identical to that of a video signal to be supplied to a corresponding video signal line 152 at the time when the primary scan is carried out, is supplied.

According to the configuration, a TFT 154, which is connected to a scan line 151 which has been subjected to a second preliminary scan, is turned ON. This allows a voltage, by which a pixel electrode, connected to a drain terminal of the TFT 154, is charged, to get closer in advance from a current charging voltage to a voltage by which the pixel electrode is to be charged during the primary scan. Further, according to the configuration, a first preliminary scan is carried out immediately before the second preliminary scan, and the first preliminary scan is carried out again, and continues to be carried out until a first scan is started. This allows a gate voltage of the TFT 154 to reach, in advance before a second scan, a voltage shown immediately before reaching a voltage which causes the TFT to be turned ON. Therefore, even in a case where a time period, during which the second scan is carried out, is short, it is possible to increase the gate voltage of the TFT 154 up to an H-level voltage which is sufficient for the pixel electrode to be charged.

(Additional Description)

A driver device of the present invention is thus arranged to be a driver device for driving a display panel, the display panel including (i) a plurality of scan lines, (ii) a plurality of video signal lines provided so as to intersect the plurality of scan lines, (iii) pixel regions defined by the plurality of scan lines and the plurality of video signal lines, (iv) pixel electrodes provided in the respective pixel regions and (v) TFTs each electrically connecting or disconnecting, in response to a scan signal supplied to a corresponding one of the plurality of scan lines, a corresponding one of the pixel electrodes with or from a corresponding one of the plurality of video signal lines, respectively, the driver device, including: a scan line driving circuit for sequentially supplying scan signals to the plurality of scan lines; a video signal line driving circuit for sequentially supplying video signals to the plurality of video signal lines; and a timing control circuit for controlling (i) a timing at which the scan line driving circuit supplies a scan signal and (ii) a timing at which the video signal line driving circuit supplies video signals, the scan line driving circuit carrying out a first scan in which (i) the scan line driving circuit starts to supply a first scan signal, which has an intermediate electric potential between a voltage of a low level in a time period during which an $(n+m)^{th}$ (n: positive integer, m: positive integer) scan line is not scanned and a voltage of a high level, to the $(n+m)^{th}$ scan line during a scan period during which an $n^{th}$ scan line is being scanned and (ii) the scan line driving circuit stops supplying the first scan signal to the $(n+m)^{th}$ scan line when scanning of the $n^{th}$ scan line is completed, and the scan line driving circuit carrying out a second scan in which the scan line driving circuit supplies a second scan signal, which has the voltage of the high level, to the $(n+m)^{th}$ scan line when the scanning of the $n^{th}$ scan line is completed.

A driver device driving method of the present invention is arranged to be a method of driving a driver device that drives a display panel, the display pane including (i) a plurality of scan lines, (ii) a plurality of video signal lines provided so as to intersect the plurality of scan lines, (iii) pixel regions defined by the plurality of scan lines and the plurality of video signal lines, (iv) pixel electrodes provided in the respective pixel regions and (v) TFTs each electrically connecting or disconnecting, in response to a scan signal supplied to a corresponding one of the plurality of scan lines, a corresponding one of the pixel electrodes with or from a corresponding one of the plurality of video signal lines, respectively, the driver device including: a scan line driving circuit for sequentially supplying scan signals to the plurality of scan lines; a video signal line driving circuit for sequentially supplying video signals to the plurality of video signal lines; and a timing control circuit for controlling (i) a timing at which the scan line driving circuit supplies a scan signal and (ii) a timing at which the video signal line driving circuit supplies video signals, the method including the steps of: (a) carrying out a first scan in which (i) the scan line driving circuit starts to supply a first scan signal, which has an intermediate electric potential between a voltage of a low level in a time period during which an $(n+m)^{th}$ (n: positive integer, m: positive integer) scan line is not scanned and a voltage of a high level, to the $(n+m)^{th}$ scan line during a scan period during which an $n^{th}$ scan line is being scanned and (ii) the scan line driving circuit stops supplying the first scan signal to the $(n+m)^{th}$ scan line when scanning of the $n^{th}$ scan line is completed, and (b) carrying out a second scan in which the scan line driving circuit supplies a second scan signal, which has the voltage of the high level, to the $(n+m)^{th}$ scan line when the scanning of the $n^{th}$ scan line is completed.

With the arrangement, the driver device supplies, during the first scan, the first scan signal to the $(n+m)^{th}$ scan line This allows a gate voltage of a TFT, that is connected to the $(n+m)^{th}$ scan line, reaches, in advance before the second scan (that is, during the scanning of the $n^{th}$ scan line), a voltage shown before reaching a voltage which causes the TFT to be turned ON. The driver device then causes the gate voltage of the TFT to reach the voltage of the high level during the second scan. That is, it is not necessary that the gate voltage of the TFT is charged up to the voltage of the high level from the voltage of the low level during the second scan, but it is merely necessary that the gate voltage of the TFT is charged up to the voltage of the high level from the voltage shown before reaching the voltage which causes the TFT to be turned ON. It is therefore possible to shorten a time period required for the gate voltage of the TFT, connected to the $(n+m)^{th}$ scan line, to reach the voltage of the high level during the second scan. This allows the gate voltage of the TFT to reach the voltage of the high level even in a case where a time period, during which the second scan is carried out, can be kept only short.

Since the gate voltage of the TFT can reach the voltage of the high level for a short period of time, it is possible to prevent a drain voltage from being inadequately charged due to a shortage in ultimate voltage of a gate terminal of the TFT. That is, it is possible to prevent a pixel electrode from being inadequately charged in a case where the pixel electrode should be charged at a high speed.

It is further possible to reduce manufacturing cost because it is not necessary to use high voltage-resistance components such as a driving circuit and a TFT. This is based on the fact that it is not necessary to increase a voltage of a scan signal, which voltage is to be applied to a gate electrode of the TFT, in order to prevent the pixel electrode from being inadequately charged due to the shortage in the ultimate voltage of the gate terminal.

Furthermore, it is possible to improve an aperture ratio because the display panel has reduced load on electric wires. This is based on the fact that it is not necessary to increase the size of the TFT in order to prevent the pixel electrode from being inadequately charged due to the shortage in the ultimate voltage of the gate terminal.

Note that examples of the case where the pixel electrode should be charged at a high speed encompass (i) a case where a display screen is large (that is, a case where load is heavy), (ii) a case where a high resolution is required, (iii) a case where a high frame rate is required and (iv) a case where a 3D display is carried out by means of driving such as driving of a parallax barrier system. Note, however, that the examples are not limited to such.

It is preferable to arrange the driver device of the present invention such that the scan line driving circuit carries out, before a primary scan that includes the first scan and the second scan, a preliminary scan in which a preliminary scan signal is supplied to each of the plurality of scan lines.

It is preferable to arrange the driver device driving method of the present invention so as to further include the step of: (c) carrying out, before a primary scan which includes the step (a) and the step (b), a preliminary scan in which a preliminary scan signal is supplied to each of the plurality of scan lines.

According to the arrangement, a TFT, which is connected to a scan line which has been subjected to the preliminary scan, is turned ON. This allows a voltage, by which a pixel electrode, connected to a drain terminal of the TFT, is charged, to get closer in advance from a current charging voltage to a voltage by which the pixel electrode is to be charged during the primary scan. Therefore, in a case where a scan period can be kept only short, it is possible to prevent the pixel electrode from being inadequately charged.

It is preferable to arrange the driver device of the present invention such that the intermediate electric potential is larger than the voltage of the low level but smaller than a minimum voltage of video signals.

It is preferable to arrange the driver device driving method of the present invention such that the intermediate electric potential is larger than the voltage of the low level but smaller than a minimum voltage of video signals.

This arrangement causes a gate-source voltage Vgs of the TFT to be smaller than 0 V (zero volt) (Vgs<0 V (Vg1'<Vs1)).

Note that, in a case where (i) the TFT has a TFT property necessary for driving of a pixel of a typical display device and (ii) Vgs<0 V (zero volt), a resistance between a source and a drain becomes high (that is, the TFT is in an OFF state). This causes a voltage of the pixel electrode to be prevented from remarkably fluctuating during the first scan, in a case where an intermediate electric potential Vg1' is less than a minimum voltage Vs1 of the video signals. As such, it is possible to suppress a reduction in display quality.

It is preferable to arrange the driver device of the present invention such that the scan line driving circuit carries out the first scan only in a case where each polarity of the video signals to be supplied to the plurality of video signal lines is reversed.

It is preferable to arrange the driver device driving method of the present invention such that the step (a) is carried out only in a case where each polarity of the video signals to be supplied to the plurality of video signal lines is reversed.

According to the arrangement, no first scan needs to be carried out in a case where the each polarity of the video signals to be supplied to the plurality of video signal lines is not reversed. This is based on the following facts (i) and (ii): (i) in the case, the pixel electrode which was positively charged merely needs to be positively charged, or the pixel electrode which was negatively charged merely needs to be negatively charged, whereas (ii) in a case where the each polarity of the video signals is reversed, the pixel electrode which was positively charged should be negatively charged and vice versa.

This makes it possible to (i) reduce a difference in time period required for charging the pixel electrode between the case where the each polarity of the video signals is reversed and the case where the each polarity of the video signals is not reversed and (ii) suppress a fluctuation in charging voltage of the pixel electrode. Examples of a driving method, in which reversal and non-reversal of the each polarity of the video signals are repetitively carried out, include an n-dot reversal driving method. Note, however, that the driving method is not limited to such an n-dot reversal driving method.

It is preferable to arrange the driver device of the present invention such that the intermediate electric potential is a ground electric potential.

It is preferable to arrange the driver device driving method of the present invention such that the intermediate electric potential is a ground electric potential.

According to the arrangement, the intermediate electric potential is equal to 0 V (zero volt). It is therefore not necessary to separately provide any electric power supply circuit for the first scan. This allows a reduction in cost. Further, since the intermediate electric potential is equal to 0 V (zero volt), it is possible to realize low-power-consumption driving. This allows a reduction in power consumption.

It is preferable to arrange the driver device of the present invention such that the scan line driving circuit can change, for each of the plurality of scan lines, at least one of (i) a scan period of the first scan and (ii) the intermediate electric potential.

It is preferable to arrange the driver device driving method of the present invention such that in the step (a), at least one of (i) a scan period of the first scan and (ii) the intermediate electric potential can be changed for each of the plurality of scan lines.

According to the arrangement, the scan line driving circuit can carry out the first scan for a long period of time in a case where the first scan should be carried out for the long period of time.

Further, according to the arrangement, the scan line driving circuit can carry out the first scan by use of a scan signal that has a large intermediate electric potential, in a case where the first scan should be carried out by use of the scan signal that has the large intermediate electric potential. Note that examples of a case where a large intermediate electric potential is required include a case where a TFT, which requires a large voltage to be applied so as to be turned ON, is used.

It is therefore possible to (i) prevent the pixel electrode from being inadequately charged and (ii) suppress the fluctuation in the charging voltage of the pixel electrode.

Note that examples of (i) the case where the first scan should be carried out for the long period of time or (ii) the case where the first scan should be carried out by use of the scan signal that has the large intermediate electric potential include a case where the each polarity of the video signals is reversed. Note, however, that the examples are not limited to such a case.

Note also that examples of (i) a case where the first scan should be carried out only for a short period of time or (ii) a case where the first scan should be carried out by use of a scan signal that has a small intermediate electric potential include a case where the each polarity of the video signals is not reversed. Note, however, that the examples are not limited to such a case.

It is preferable to arrange the driver device of the present invention such that the scan line driving circuit completes the second scan after the voltage to be supplied during the second scan is reduced, at a slant, from the high level.

It is preferable to arrange the driver device driving method of the present invention such that in the step (b), the second scan is completed after the voltage to be supplied during the second scan is reduced, at a slant, from the high level to a predetermined value.

According to the arrangement, the scan signal to be supplied during the second scan is thus reduced at a slant from the voltage of the high level. This makes it possible to (i) prevent the pixel electrode from being inadequately charged and (ii) prevent the scan signal from steeply falling. It is therefore possible to alleviate a reduction (that is, a level shift) in the charging voltage of the pixel electrode due to a parasitic capacitance which is formed by a gate and a drain of the TFT. This can ultimately prevent (i) a flicker in image to be displayed and (ii) a deterioration in display (including display defects such as image sticking).

It is preferable to arrange the driver device of the present invention such that each of the TFTs has a semiconductor layer made of an oxide semiconductor or p-Si.

It is preferable to arrange the driver device driving method of the present invention such that each of the TFTs has a semiconductor layer made of an oxide semiconductor or p-Si.

According to the arrangement, in a case where a gate-source voltage Vgs of each of the TFTs is not more than 0 V (zero volt), a drain current, in the each of the TFTs whose semiconductor layer is made of oxide semiconductor or p-Si (Polycrystalline Silicon), is smaller and more substantially stable than that in a TFT whose semiconductor layer is made of a-Si (amorphous Silicon). That is, each of the TFTs whose semiconductor layer is made of oxide semiconductor or p-Si is unlikely to be affected by a difference in the gate-source voltage in a case where Vgs≤0 V. It is therefore possible to reduce a fluctuation in electric potential of the pixel electrode. This ultimately allows an improvement in display quality.

Note that examples of the oxide semiconductor of which the semiconductor layer of the TFT is made encompass indium gallium zinc oxide (IGZO) and zinc oxide (ZnO). Note, however, that the oxide semiconductor is not limited to such examples.

It is preferable to arrange the driver device of the present invention such that the preliminary scan includes a first preliminary scan and a second preliminary scan, the scan line driving circuit carries out (i) the second preliminary scan in which a preliminary scan signal, which has a voltage of a high level, is supplied and (ii) the first preliminary scan in which a preliminary scan signal, which has an intermediate electric potential between a voltage of a low level in a time period during which the each of the plurality of scan lines is not scanned and the voltage of the high level, is supplied, and the scan line driving circuit continues, in the preliminary scan, the first preliminary scan from when the second preliminary scan is completed to when the first scan is started.

It is preferable to arrange the driver device driving method of the present invention such that the step (c) includes the steps of: (d) carrying out a second preliminary scan in which a preliminary scan signal, which has a voltage of a high level, is supplied; and (e) carrying out a first preliminary scan in which a preliminary scan signal, which has an intermediate electric potential between (i) a voltage of a low level in a time period during which the each of the plurality of scan lines is not scanned and (ii) the voltage of the high level, is supplied, and the step (e) is continued, in the step (c), from when the step (d) is completed to when the step (a) is started.

According to the arrangement, a TFT, which is connected to a scan line which has been subjected to the second preliminary scan, is turned ON. This allows a voltage, by which a pixel electrode, connected to a drain terminal of the TFT, is charged, to get closer in advance from a current charging voltage to a voltage by which the pixel electrode is to be charged during the primary scan. Further, according to the arrangement, the first preliminary scan is continued until the first scan is started. This allows a gate voltage of the TFT to reach, in advance before the second scan, a voltage directly before reaching a voltage which causes the TFT to be turned ON. Therefore, even in a case where a time period, during which the second scan is carried out, is short, it is possible to increase the gate voltage of the TFT up to the voltage of the high level that is sufficient for the pixel electrode to be charged.

It is preferable to arrange the driver device of the present invention such that the preliminary scan includes a first preliminary scan and a second preliminary scan, the scan line driving circuit carries out (i) the second preliminary scan in which a preliminary scan signal, which has a voltage of a high level, is supplied and (ii) the first preliminary scan in which a preliminary scan signal, which has an intermediate electric potential between a voltage of a low level in a time period during which the each of the plurality of scan lines is not scanned and the voltage of the high level, is supplied, and the scan line driving circuit carries out, in the preliminary scan, the first preliminary scan immediately before the second preliminary scan, and the scan line driving circuit continues, in the preliminary scan, the first preliminary scan from when the second preliminary scan is completed to when the first scan is started.

It is preferable to arrange the driver device driving method of the present invention such that the step (c) includes the steps of: (d) carrying out a second preliminary scan in which a preliminary scan signal, which has a voltage of a high level, is supplied; and (e) carrying out a first preliminary scan in which a preliminary scan signal, which has an intermediate electric potential between (i) a voltage of a low level in a time period during which the each of the plurality of scan lines is scanned and (ii) the voltage of the high level, is supplied, and the step (e) is carried out, in the step (c), immediately before the step (d), and the step (e) is continued, in the step (c), from when the step (d) is completed to when the step (a) is started.

According to the arrangement, a TFT, which is connected to a scan line which has been subjected to the second preliminary scan, is turned ON. This allows a voltage, by which a pixel electrode, connected to a drain terminal of the TFT, is charged, to get closer in advance from a current charging voltage to a voltage by which the pixel electrode is to be charged during the primary scan. Further, according to the arrangement, the first preliminary scan is carried out immediately before the second preliminary scan, and the first preliminary scan is carried out again, and continues to be carried out until the first scan is started. This allows a gate voltage of the TFT to reach, in advance before the second scan, a voltage shown immediately before reaching a voltage which causes the TFT to be turned ON. Therefore, even in a case where a time period, during which the second scan is carried out, is short, it is possible to increase the gate voltage of the TFT up to the voltage of the high level that is sufficient for the pixel electrode to be charged.

It is preferable to arrange the driver device of the present invention such that in a case where each polarity of the video signals to be supplied to the plurality of video signal lines is not reversed, the scan line driving circuit carries out at least one of (i) a process of shortening the scan period of the first scan and (ii) a process of decreasing the intermediate electric potential in the first scan.

It is preferable to arrange the driver device driving method of the present invention such that in the step (a), in a case where each polarity of the video signals to be supplied to the plurality of scan lines is not reversed, at least one of (i) a process of shortening the scan period of the first scan and (ii) a process of decreasing the intermediate electric potential in the first scan can be carried out.

According to the arrangement, the scan line driving circuit 12 can carry out the first scan for a long period of time in a case where the first scan should be carried out for the long period of time, that is, in a case where the each polarity of the video signals is reversed. In contrast, the scan line driving circuit 12 can carry out the first scan only for a short period of time in a case where the first scan should be carried out only for the short period of time, that is, in the case where the each polarity of the video signals is not reversed.

Further, according to the arrangement, the scan line driving circuit 12 can carry out the first scan by use of a scan signal that has a large intermediate electric potential, in a case where the first scan should be carried out by use of the scan signal that has the large intermediate electric potential, that is, in the case where the each polarity of the video signals is reversed. In contrast, the scan line driving circuit 12 can carry out the first scan by use of a scan signal that has a small intermediate electric potential, in a case where the first scan should be carried out by use of the scan signal that has the small intermediate electric potential, that is, in the case where the each polarity of the video signals is not reversed.

It is therefore possible to (i) prevent the pixel electrode from being inadequately charged and (ii) suppress a fluctuation in charging voltage of the pixel electrode.

It is preferable to configure a display device of the present invention so as to include: a display panel including (i) a plurality of scan lines, (ii) a plurality of video signal lines provided so as to intersect the plurality of scan lines, (iii) pixel regions defined by the plurality of scan lines and the plurality of video signal lines, (iv) pixel electrodes provided in the respective pixel regions and (v) TFTs each electrically connecting or disconnecting, in response to a scan signal supplied to a corresponding one of the plurality of scan lines, a corresponding one of the pixel electrodes with or from a corresponding one of the plurality of video signal lines, respectively; and the above-described driver device for driving the display panel.

According to the configuration, it is possible to yield an effect similar to that of the above-described driver device.

The present invention is not limited to the description of the embodiments above, and can therefore be modified by a skilled person in the art within the scope of the claims. Namely, an embodiment derived from a proper combination of technical means disclosed in different embodiments is encompassed in the technical scope of the present invention.

INDUSTRIAL APPLICABILITY

A driver device of the present invention is suitably applicable to, for example, a television receiver, a personal computer, a car navigation system, and a mobile phone.

REFERENCE SIGNS LIST

1: display device
10: driver device
11: timing control circuit
12: scan line driving circuit
13: video signal line driving circuit
14: electric power supply circuit
15: display panel
121: scan drive controlling section
122: shift register group
123: level shifter group
124: output circuit section
151: scan line
152: video signal line
153: retention capacitor line
154: TFT
155: pixel electrode
156: pixel region

The invention claimed is:
1. A driver device for driving a display panel,
the display panel including (i) a plurality of scan lines, (ii) a plurality of video signal lines provided so as to intersect the plurality of scan lines, (iii) pixel regions defined by the plurality of scan lines and the plurality of video signal lines, (iv) pixel electrodes provided in the respective pixel regions and (v) TFTs each electrically connecting or disconnecting, in response to a scan signal supplied to a corresponding one of the plurality of scan lines, a corresponding one of the pixel electrodes with or from a corresponding one of the plurality of video signal lines, respectively,
said driver device, comprising:
a scan line driving circuit for sequentially supplying scan signals to the plurality of scan lines;
a video signal line driving circuit for sequentially supplying video signals to the plurality of video signal lines; and
a timing control circuit for controlling (i) a timing at which the scan line driving circuit supplies a scan signal and (ii) a timing at which the video signal line driving circuit supplies video signals,
the scan line driving circuit carrying out a first scan in which (i) the scan line driving circuit starts to supply a first scan signal, which has an intermediate electric potential between a voltage of a low level in a time period during which an $(n+m)^{th}$ (n: positive integer, m: positive integer) scan line is not scanned and a voltage of a high level, to the $(n+m)^{th}$ scan line during a scan period during which an $n^{th}$ scan line is being scanned and (ii) the scan line driving circuit stops supplying the first scan signal to the $(n+m)^{th}$ scan line when scanning of the $n^{th}$ scan line is completed, the scan line driving circuit carrying out a second scan in which the scan line driving circuit supplies a second scan signal, which has the voltage of the high level, to the $(n+m)^{th}$ scan line when the scanning of the $n^{th}$ scan line is completed, the scan line driving circuit carrying out, before a primary scan that includes the first scan and the second scan, a preliminary scan in which a preliminary scan signal is supplied to each of the plurality of scan lines, the preliminary scan including a first preliminary scan and a second preliminary scan, and the scan line driving circuit carrying out (i) the second preliminary scan in which a preliminary scan signal, which has a voltage of a high level, is supplied and (ii) the first preliminary scan in which a preliminary scan signal, which has an intermediate electric potential between a voltage of a low level in a time period during which the each of the plurality of scan lines is not scanned and the voltage of the high level, is supplied, and the scan line driving circuit continuing, in the preliminary scan, the first preliminary scan from when the second preliminary scan is completed to when the first scan is started.

2. A driver device for driving a display panel, the display panel including (i) a plurality of scan lines, (ii) a plurality of video signal lines provided so as to intersect the plurality of scan lines, (iii) pixel regions defined by the plurality of scan lines and the plurality of video signal lines, (iv) pixel electrodes provided in the respective pixel regions and (v) TFTs each electrically connecting or disconnecting, in response to a scan signal supplied to a corresponding one of the plurality of scan lines, a corresponding one of the pixel electrodes with or from a corresponding one of the plurality of video signal lines, respectively, said driver device, comprising:

a scan line driving circuit for sequentially supplying scan signals to the plurality of scan lines;

a video signal line driving circuit for sequentially supplying video signals to the plurality of video signal lines; and a timing control circuit for controlling (i) a timing at which the scan line driving circuit supplies a scan signal and (ii) a timing at which the video signal line driving circuit supplies video signals, the scan line driving circuit carrying out a first scan in which (i) the scan line driving circuit starts to supply a first scan signal, which has an intermediate electric potential between a voltage of a low level in a time period during which an $(n+m)^{th}$ (n: positive integer, m: positive integer) scan line is not scanned and a voltage of a high level, to the $(n+m)^{th}$ scan line during a scan period during which an $n^{th}$ scan line is being scanned and (ii) the scan line driving circuit stops supplying the first scan signal to the $(n+m)^{th}$ scan line when scanning of the $n^{th}$ scan line is completed, the scan line driving circuit carrying out a second scan in which the scan line driving circuit supplies a second scan signal, which has the voltage of the high level, to the $(n+m)^{th}$ scan line when the scanning of the $n^{th}$ scan line is completed, the scan line driving circuit being capable of changing, for each of the plurality of scan lines, at least one of (i) a scan period of the first scan and (ii) the intermediate electric potential, and in a case where each polarity of the video signals to be supplied to the plurality of video signal lines is not reversed, the scan line driving circuit carrying out at least one of (i) a process of shortening the scan period of the first scan and (ii) a process of decreasing the intermediate electric potential in the first scan.

3. The driver device as set forth in claim 1, wherein:
the intermediate electric potential is larger than the voltage of the low level but smaller than a minimum voltage of video signals.

4. The driver device as set forth in claim 1, wherein:
the scan line driving circuit carries out the first scan only in a case where each polarity of the video signals to be supplied to the plurality of video signal lines is reversed.

5. The driver device as set forth in claim 1, wherein:
the intermediate electric potential is a ground electric potential.

6. The driver device as set forth in claim 1, wherein:
the scan line driving circuit completes the second scan after the voltage to be supplied during the second scan is reduced, at a slant, from the high level.

7. The driver device as set forth in claim 1, wherein:
each of the TFTs has a semiconductor layer made of an oxide semiconductor or p-Si.

8. The driver device as set forth in claim 1, wherein:
each of the TFTs has a semiconductor layer made of an oxide semiconductor, and
the oxide semiconductor is In—Ga—Zn—O.

9. The driver device as set forth in claim 1, wherein:
the preliminary scan includes a first preliminary scan and a second preliminary scan,
the scan line driving circuit carries out (i) the second preliminary scan in which a preliminary scan signal, which has a voltage of a high level, is supplied and (ii) the first preliminary scan in which a preliminary scan signal, which has an intermediate electric potential between a voltage of a low level in a time period during which the each of the plurality of scan lines is not scanned and the voltage of the high level, is supplied, and
the scan line driving circuit carries out, in the preliminary scan, the first preliminary scan immediately before the second preliminary scan, and the scan line driving circuit continues, in the preliminary scan, the first preliminary scan from when the second preliminary scan is completed to when the first scan is started.

10. A method of driving a driver device that drives a display panel, the display pane including (i) a plurality of scan lines, (ii) a plurality of video signal lines provided so as to intersect the plurality of scan lines, (iii) pixel regions defined by the plurality of scan lines and the plurality of video signal lines, (iv) pixel electrodes provided in the respective pixel regions and (v) TFTs each electrically connecting or disconnecting, in response to a scan signal supplied to a corresponding one of the plurality of scan lines, a corresponding one of the pixel electrodes with or from a corresponding one of the plurality of video signal lines, respectively, the driver device including:
- a scan line driving circuit for sequentially supplying scan signals to the plurality of scan lines;
- a video signal line driving circuit for sequentially supplying video signals to the plurality of video signal lines; and
- a timing control circuit for controlling (i) a timing at which the scan line driving circuit supplies a scan signal and (ii) a timing at which the video signal line driving circuit supplies video signals, said method comprising the steps of:
(a) carrying out a first scan in which (i) the scan line driving circuit starts to supply a first scan signal, which has an intermediate electric potential between a voltage of a low level in a time period during which an $(n+m)^{th}$ (n: positive integer, m: positive integer) scan line is not scanned and a voltage of a high level, to the $(n+m)^{th}$ scan line during a scan period during which an $n^{th}$ scan line is being scanned and (ii) the scan line driving circuit stops supplying the first scan signal to the $(n+m)^{th}$ scan line when scanning of the $n^{th}$ scan line is completed;
(b) carrying out a second scan in which the scan line driving circuit supplies a second scan signal, which has the voltage of the high level, to the $(n+m)^{th}$ scan line when the scanning of the $n^{th}$ scan line is completed; and
(c) carrying out, before a primary scan which includes the step (a) and the step (b), a preliminary scan in which a preliminary scan signal is supplied to each of the plurality of scan lines, the step (c) includes the steps of:
(d) carrying out a second preliminary scan in which a preliminary scan signal, which has a voltage of a high level, is supplied; and
(e) carrying out a first preliminary scan in which a preliminary scan signal, which has an intermediate electric potential between (i) a voltage of a low level in a time period during which the each of the plurality of scan lines is not scanned and (ii) the voltage of the high level, is supplied, the step (e) being continued, in the step (c), from when the step (d) is completed to when the step (a) is started.

11. The method as set forth in claim 10, wherein:
the step (c) includes the steps of:
(d) carrying out a second preliminary scan in which a preliminary scan signal, which has a voltage of a high level, is supplied; and
(e) carrying out a first preliminary scan in which a preliminary scan signal, which has an intermediate electric potential between (i) a voltage of a low level in a time period during which the each of the plurality of scan lines is scanned and (ii) the voltage of the high level, is supplied, and the step (e) is carried out, in the step (c), immediately before the step (d), and the step (e) is continued, in the step (c), from when the step (d) is completed to when the step (a) is started.

12. A display device, comprising:
a display panel including (i) a plurality of scan lines, (ii) a plurality of video signal lines provided so as to intersect the plurality of scan lines, (iii) pixel regions defined by the plurality of scan lines and the plurality of video signal lines, (iv) pixel electrodes provided in the respective pixel regions and (v) TFTs each electrically connecting or disconnecting, in response to a scan signal supplied to a corresponding one of the plurality of scan lines, a corresponding one of the pixel electrodes with or from a corresponding one of the plurality of video signal lines, respectively; and
a driver device, recited in claim 1, for driving the display panel.

* * * * *